United States Patent [19]

Natori et al.

[11] Patent Number: 5,756,580
[45] Date of Patent: May 26, 1998

[54] POLYMERIC COMPOSITE MATERIAL

[75] Inventors: Itaru Natori, Yokohama; Kimio Imaizumi, Kiyose; Satoru Kaji, Kurashiki, all of Japan

[73] Assignee: Asahi Kasei Kogyo Kabushiki Kaisha, Osaka, Japan

[21] Appl. No.: 836,210

[22] PCT Filed: Nov. 21, 1995

[86] PCT No.: PCT/JP95/02370

§ 371 Date: May 6, 1997

§ 102(e) Date: May 6, 1997

[87] PCT Pub. No.: WO96/16117

PCT Pub. Date: May 30, 1996

[30] Foreign Application Priority Data

Nov. 21, 1994 [JP] Japan ................. 6-286902

[51] Int. Cl.⁶ ........................... C08F 8/00
[52] U.S. Cl. ........................... 525/100
[58] Field of Search ........................... 525/100

[56] References Cited

U.S. PATENT DOCUMENTS

| | | | |
|---|---|---|---|
| 4,020,251 | 4/1977 | Hsieh | 526/20 |
| 4,051,199 | 9/1977 | Udipi et al. | 526/56 |
| 4,113,930 | 9/1978 | Moczygemba | 526/25 |
| 4,127,710 | 11/1978 | Hsieh | 526/133 |
| 4,131,653 | 12/1978 | Hsieh et al. | 526/20 |
| 4,138,536 | 2/1979 | Hsieh | 526/19 |
| 4,179,480 | 12/1979 | Hsieh | 525/99 |
| 4,237,246 | 12/1980 | Hsieh | 525/332 |

FOREIGN PATENT DOCUMENTS

| | | |
|---|---|---|
| 58-141269 | 8/1983 | Japan. |
| 222355 | 1/1990 | Japan. |
| 9521217 | 8/1995 | WIPO. |

OTHER PUBLICATIONS

L. A. Mango et al., Hydrogenation of Unsaturated Polymers with Diimide, *Die Makromolekulare Chemie*, vol. 163, pp. 13–36 (1973).

Z. Sharaby et al., Kinetics and Mechanism of the Anionic Polymerization of Cyclohexadienes Initiated by Nathphalene Radical Anions and Dianions, *Journal of Polymer Science: Polymer Chemistry Edition*, vol. 20, pp. 901–915 (1982).

B. Francois et al., Kinetics of 1,3–cyclohexadiene polymerization initiated by organolithium compounds in a non–polar medium, *Makromol. Chem.*, vol. 191, pp. 2743–2753 (1990).

*Primary Examiner*—Terressa Mosley
*Attorney, Agent, or Firm*—Birch, Stewart, Kolasch & Birch, LLP

[57] ABSTRACT

The present invention provides a novel polymeric composite material which contains at least two polymers selected from the group consisting of a polymer having a cyclic conjugated diene monomer unit and/or a cyclic olefin monomer unit and a modified polymer thereof. The novel composite material of the present invention can exhibit excellent thermal and mechanical properties while maintaining properties as a mono material so that it is widely applicable to major uses for polymer materials.

27 Claims, No Drawings

POLYMERIC COMPOSITE MATERIAL

TECHNICAL FIELD

The present invention relates to a novel polymeric composite material which comprises two or more polymers having a cyclic monomer unit. More particularly, the present invention relates to a novel polymeric composite material which comprises a resin composition containing at least two polymers selected from the group consisting of a polymer having a cyclic conjugated diene monomer unit and/or a cyclic olefin monomer unit and a modified polymer thereof, or which comprises a resin composition containing other polymers which are further added to the resin composition according to desire.

BACKGROUND ART

In research on a polymeric material which can be used as an industrial material, many studies have been conducted to find materials which exhibit excellent heat resistance and mechanical strength. As a result, various types of material have been proposed.

These polymeric materials are used in a wide variety of fields such as an automobile part, an electrical part, an aircraft and space part, sports and leisure goods and general variety goods because they have outstanding features of being light, of being shaped highly freely and of exhibiting various properties according to the types of use. Their importance has drastically increased because of market demand and the progress of scientific techniques.

However, one of the most important problems to be solved when such polymeric materials are used as an industrial material in a wide range of applications is the fact that the mechanical properties of an organic polymeric material change considerably depending on the temperature of the atmosphere during use.

It is believed that the major cause of this problem is that the polymer chains are converted to a rubber state from a glass state when the atmosphere temperature in use reaches the region above the glass transition temperature (Tg) of the polymer.

Therefore, it is essentially impossible to solve this problem by using a polymeric material having a single molecular structure so that heretofore many studies have been conducted to solve this problem by combining plural polymeric materials.

For example, as one of the specific methods to solve this problem, an attempt to obtain polymeric materials having low sensitivity to atmosphere temperature has often been made by compounding or copolymerizing one polymeric material with other polymers having a different Tg in order to improve the mechanical properties of the polymeric material (e.g., rigidity at a high temperature, impact resistance, strength at a high temperature and dimensional stability).

However, in prior art wherein the above attempt has been made, it is necessary to diversify the types of polymers to be compounded according to the improvement purposes. This does not always satisfy a market demand for making the number of types of polymeric materials used as an industrial material as small as possible.

Therefore, aggressive studies on (hydrogenated) conjugated diene type polymers such as polybutadiene and polyisoprene, which are representative components contained in composite materials, have been made. Since the conjugated diene type polymers can be subjected to living anionic polymerization, they have high degrees-of-freedom of polymer chain design and their material properties are controlled relatively easily. When they are used as an improvement material for the composite material, they have the possibility to impart rigidity at a high temperature, impact strength, strength at a high temperature, dimensional stability and the like by compounding or copolymerizing the same type materials.

There is currently a strong demand for development of a conjugated diene type polymeric material having higher thermal properties (melting point, glass transition temperature, heat distortion temperature and the like) and mechanical properties (tensile modulus, flexural modulus and the like).

As one of the most effective methods to solve this problem, investigations on a method for obtaining an excellent composite material improved in necessary properties using only the same type of polymer is usually carried out. Such a method comprises introducing a cyclic monomer unit into a polymer chain of the conjugated diene type polymer to improve the structure of the polymer chain of the conjugated diene type polymer by homopolymerizing or copolymerizing not only a monomer having relatively small steric hindrance such as butadiene and isoprene but also a monomer having large steric hindrance, i.e., a cyclic conjugated diene type monomer, and further by conducting hydrogenation, if necessary; synthesizing a polymer optionally having high thermal properties (rigidity and strength), impact strength and dimensional stability in the same type of polymer (a conjugated diene type polymer); and compounding the thus-obtained polymers with each other or with other polymers.

Although the prior art has proposed catalysts exhibiting polymerization activity satisfactory to some extent for the monomer having relatively small steric hindrance such as butadiene and isoprene, there has not been found a catalyst exhibiting fully satisfactory polymerization activity for the monomer having large steric hindrance, i.e., the cyclic conjugated diene type monomer.

Die Makromolekulare Chemie., 163, 13 (1973) discloses cyclohexadiene homopolymer obtained by polymerizing 1,3-cyclohexadiene using a large amount of an organic lithium compound as a catalyst. The oligomer obtained therein has a number-average molecular weight of no more than 6,500.

There is also disclosed hydrogenated cyclohexadiene homopolymer (polycyclohexane) having a low molecular weight, which is obtained by hydrogenating the carbon-carbon double bonds of this oligomer with extremely excessive amounts of paratoluene sulfonyl hydrazide. However, the hydrogenated polymer disclosed therein has an extremely low molecular weight. The disclosed hydrogenation method also has a serious problem of great economic disadvantages because of a stoichiometric reaction.

J. Polym. Sci, Polym. Chem. Ed., 20, 901 (1982) discloses cyclohexadiene homopolymer obtained by polymerizing 1,3-cyclohexadiene using an organic sodium compound as a catalyst. The organic sodium used therein is sodium naphthalene. A dianion produced from two radical anions is a polymerization initiator point. In other words, although the cyclohexadiene homopolymer reported therein seemingly has a number-average molecular weight of 38,700, it actually has molecular chains having a number-average molecular weight of 19,350 which grow from the polymerization initiator point in two directions. The polymerization method disclosed in this reference is not industrially useful because the polymerization is conducted at an extremely low temperature.

Makromol. Chem., 191, 2743 (1990) discloses a method for polymerizing 1,3-cyclohexadiene by using polystyryl lithium as an initiator. The polymerization method disclosed in this reference suggests that a transfer reaction with abstraction of a lithium cation and an elimination reaction of a lithium hydride often occurs during the polymerization reaction. It was reported that a block polymer of styrene-cyclohexadiene was not obtained at room temperature and only cyclohexadiene homopolymer having a low molecular weight was obtained though the polymerization reaction is conducted using polystyryl lithium as an initiator.

It was also reported that when block polymerization is conducted at −10° C. with polystyryl lithium, a block copolymer of styrene-cyclohexadiene having a molecular weight of about 20,000 was obtained with cyclohexadiene homopolymer at a considerably low yield.

However, the copolymer obtained has an extremely small content of a cyclohexadiene block. Moreover, this document neither suggests nor teaches a block copolymer containing a chain conjugated diene type monomer, a multiblock of a triblock or more, a radial block and the like.

U.S. Pat. No. 4,127,710 discloses a polymer mixture obtained by polymerizing a monomer mixture containing 1,3-cyclohexadiene, styrene and butadiene with a multifunctional initiator. However, U.S. Pat. No. 4,127,710 not only teaches that the yield of the polymer mixture obtained decreases with an increase of the ratio of 1,3-cyclohexadiene in the monomer mixture, but also fails to provide a cyclohexadiene homopolymer having a high molecular weight, a cyclohexadiene type block copolymer and particularly a block copolymer having a triblock or more. Further, this patent neither suggests nor discloses a composite material of cyclohexadiene type polymers.

U.S. Pat. No. 4,138,536 discloses a polymer mixture obtained by polymerizing a monomer mixture containing 1,3-cyclohexadiene and styrene with a multifunctional initiator. However, U.S. Pat. No. 4,138,536 not only teaches that the yield of the polymer mixture obtained decreases with an increase of the ratio of 1,3-cyclohexadiene in the monomer mixture, but also fails to provide a cyclohexadiene homopolymer having a high molecular weight, a cyclohexadiene type block copolymer and particularly a block copolymer having a triblock or more. Further, this patent neither suggests nor discloses a composite material of cyclohexadiene type polymers.

U.S. Pat. No. 4,179,480 discloses a composition of a styrene-butadiene-styrene block copolymer and a polymer mixture obtained by polymerizing a monomer mixture containing 1,3-cyclohexadiene, styrene and butadiene with a multifunctional initiator. However, the composition disclosed therein does not include a composition of cyclohexadiene type polymers. Particularly, U.S. Pat. No. 4,179,480 neither suggests nor teaches a composite material of cyclohexadiene type block copolymers.

As explained above, the prior art has not succeeded in obtaining an excellent polymeric composite material comprising a polymer having a cyclic monomer unit which is fully satisfactory as an industrial material.

DISCLOSURE OF THE INVENTION

The present inventors have made intensive and extensive studies to solve the above problem. As a result, they have succeeded in synthesizing a polymer comprising a cyclic monomer, which had not been reported heretofore (PCT/JP94/00822 and PCT/JP94/00973). Further, the present inventors have made intensive and extensive studies to obtain an excellent resin composition comprising these polymers. As a result, they have found a surprising fact that a composition comprising at least two of these polymers exhibits the most excellent properties as an industrial material and thus have accomplished the present invention.

The present invention provides a polymeric composite material comprising at least two polymers selected from the group consisting of a polymer having a polymer chain represented by the following formula (IA) (hereinafter Polymer I) and a modified polymer having a polymer chain represented by the following formula (IB) (hereinafter Modified Polymer I):

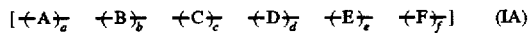

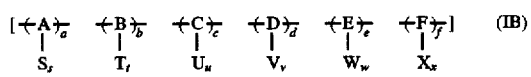

In formulas (IA) and (IB), A to F represent monomer units constituting a polymer chain and may be arranged in any order; a to f represent wt. % of Monomer Units A to F, respectively, based on the total weight of Monomer Units A to F; the number-average molecular weight of the polymer in terms of standard polystyrene is 500 to 5,000,000; when Polymer I and/or Modified Polymer I comprises Monomer Unit A, at least one of Monomer Unit A links to the polymer chain through a 1,4-bond; (A) represents one or more cyclic olefin type monomer units; (B) represents one or more cyclic conjugated diene type monomer units; (C) represents one or more chain conjugated diene type monomer units; (D) represents one or more vinyl aromatic monomer units; (E) represents one or more polar monomer units; (F) represents ethylene monomer units or one or more α-olefin type monomer units; and a to f satisfy the following relation:

$$a+b+c+d+e+f=100,$$

$$0 \leq a, b \leq 100,$$

$$0 \leq c, d, e, f < 100,$$

and $$a+b \neq 0.$$

In formula (IB), S to X represent modified groups and independently represent a functional group comprising at least one of oxygen (O), nitrogen (N), silicone (Si), sulfur (S), phosphorus (P) and halogen (F, Cl, Br and I) or an organic compound residual group containing the functional group; and s to x represent wt. % of S to X, respectively, based on the weight of Modified Polymer I, and satisfy the following relation:

$$0 < s+t+u+v+w < 100,$$

and $$0 \leq s, t, u, v, w < 100.$$

Monomer unit A represents one or more cyclic olefin type monomer units. It is preferably a cyclic monomer unit having a 5 to 8-membered ring represented by the following formula (II), most preferably a cyclic monomer unit having a 6-membered ring represented by the following formula (IV):

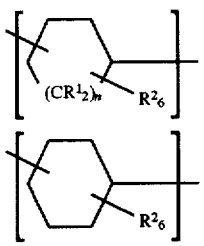

(II)

(IV)

wherein n represents an integer of 1 to 4; each $R^1$ independently represents a hydrogen atom, a halogen atom, an alkyl group having 1 to 20 carbon atoms, an unsaturated aliphatic hydrocarbon group having 2 to 20 carbon atoms, an aryl group having 5 to 20 carbon atoms, a cycloalkyl group having 3 to 20 carbon atoms, a cyclodienyl group having 4 to 20 carbon atoms or a heterocyclic group having a 5 to 10-membered ring and at least one nitrogen, oxygen or sulfur as a hetero atom; and $R^2$ independently represents a hydrogen atom, a halogen atom, an alkyl group having 1 to 20 carbon atoms, an unsaturated aliphatic hydrocarbon group having 2 to 20 carbon atoms, and an aryl group having 5 to 20 carbon atoms, a cycloalkyl group having 3 to 20 carbon atoms, a cyclodienyl group having 4 to 20 carbon atoms or a heterocyclic group having a 5 to 10-membered ring and at least one nitrogen, oxygen or sulfur as a hetero atom Specific examples of Monomer Unit A include a cyclopentene monomer unit, a cyclohexene monomer unit, a cyclooctene monomer unit and a derivative unit thereof. Particularly, a cyclohexene monomer unit and a derivative unit thereof are preferable.

When the composite material of the present invention is applied to uses or a field wherein excellent thermal and mechanical properties or functions are demanded, the content of Monomer Unit A is preferably 1 to 100 wt. %, particularly preferably 5 to 100 wt. %, most preferably 10 to 100 wt. %.

Monomer Unit B is one or more cyclic conjugated diene type monomer units. It is preferably a cyclic monomer unit having a 5 to 8-membered ring represented by the following formula (III), most preferably a cyclic monomer unit having a 6-membered ring represented by the following formula (V):

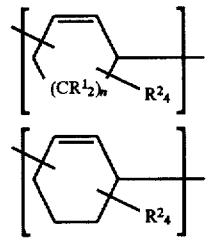

(III)

(V)

wherein n, $R^1$ and $R^2$ are the same as defined in formula (II).

Specific examples of Monomer Unit B include a cyclopentadiene monomer unit, a cyclohexadiene monomer unit, a cyclooctadiene monomer unit and a derivative unit thereof. Particularly, a cyclohexadiene monomer unit and a derivative unit thereof are preferable.

The total content of Monomer Units A and B is not particularly restricted since it is varied according to the use for the polymeric material. It is generally 0.001 to 100 wt. %, preferably 0.01 to 100 wt. %, particularly preferably 0.1 to 100 wt. %.

The ratio of 1,2-bond/1,4-bond (mol %) in Monomer Units A and B is preferably 99/1 to 1/99, more preferably 95/5 to 5/95, particularly preferably 90/10 to 10/90, most preferably 80/20 to 20/80.

Monomer Unit C is one or more chain conjugated diene type monomer units, for instance, a monomer unit derived from 1,3-butadiene, isoprene, 2,3-dimethyl-1,3-butadiene, 1,3-pentadiene, 1,3-hexadiene or the like.

Monomer Unit D is one or more vinyl aromatic monomer units, for instance, a monomer unit derived from styrene, α-methylstyrene, o-methylstyrene, p-methylstyrene, p-tert-butylstyrene, 1,3-dimethylstyrene, divinylbenzene, vinylnaphthalene, vinylanthracene, 1,1-diphenylethylene, m-diisoprenylbenzene, vinylpyridine or the like.

Monomer Unit E is one or more polar monomer units. It includes a polar vinyl type monomer such as methyl methacrylate, methyl acrylate, acrylonitrile, methylvinylketone and α-methyl cyanoacrylate and a monomer unit derived from ethylene oxide, propylene oxide, cyclic lactone, cyclic lactam, cyclic siloxane and the like.

Monomer Unit F is an ethylene monomer unit or one or more α-olefin type monomer units.

Monomer Units C to F may be monomer units derived by conducting hydrogenation, halogenation, alkylation and the like after a polymerization reaction.

Each number-average molecular weight (in terms of standard polystyrene) of Polymer I and Modified Polymer I is 500 to 5,000,000.

In use as a functional material, each number-average molecular weight of Polymer I and Modified Polymer I is most desirably in the range of generally 500 to 2,000,000, preferably 500 to 1,000,000, particularly preferably 1,000 to 800,000, most preferably 1,500 to 500,000.

In use as a structural material, the number-average molecular weight of a polymer chain is generally 1,000 to 5,000,000, preferably 1,500 to 4,000,000, more preferably 2,000 to 3,000,000, particularly preferably 2,500 to 2,000,000, most preferably 3,000 to 1,000,000.

Taking industrial productivity into consideration, each of the number-average molecular weights is desirably 500 to 4,000,000, preferably 500 to 3,000,000, more preferably 500 to 2,000,000, particularly preferably 500 to 1,000,000, most preferably 1,000 to 500,000.

When each of the number-average molecular weights is less than 500, the composite material of the present invention becomes unstable to heat so that it is not suitable for an industrial material. When each of the number-average molecular weights is 5,000,000 or more, the polymerization period becomes long and the melt viscosity of the polymer considerably increases. This is not suitable in view of industrial productivity.

Each molecular weight distribution of Polymer I and Modified Polymer I of the present invention (Mw/Mn) is 1.01 to 10, preferably 1.03 to 7.0, particularly preferably 1.05 to 5.0.

Most preferable Polymer I is a homopolymer comprising Monomer Unit B (b=100), a copolymer comprising two or more types of Monomer Unit B (b=100), a polymer (a+b=100 and a>0 or a=100) obtained by subjecting a part or the whole of a carbon-carbon double bond contained in the above polymers to a hydrogenation reaction, or a polymer (a+b<100) obtained by preparing a cyclic conjugated diene type polymer comprising Monomer Unit B and other monomer units copolymerizable with Monomer Unit B and subjecting a part or the whole of a carbon-carbon double bond contained in the resultant polymer to a hydrogenation reaction.

Although the hydrogenation ratio of carbon-carbon double bonds in the cyclic conjugated diene type polymer, which forms Monomer Unit A in the polymer, is not particularly restricted, it is generally preferably 1 to 100 mol %, more preferably 5 to 100 mol %, particularly preferably 10 to 100 mol %, most preferably 20 to 100 mol %. In application to uses and fields demanding particularly good thermal and mechanical properties, the hydrogenation ratio is generally 50 to 100 mol %, preferably 70 to 100 mol %, most preferably 90 mol % or more.

Most preferable Modified Polymer I is a modified polymer prepared by adding a functional group or an organic compound residual group containing functional groups to the most preferable Polymer I of the present invention.

When Polymer I of the present invention is a copolymer, Modified Polymer I includes a block copolymer having, for example, a diblock, triblock, tetrablock, multiblock, radial block, star block and comb type block, a graft copolymer, a taper copolymer, a random copolymer, an alternating copolymer and the like.

When Polymer I is a block Polymer I containing a block unit in a polymer chain, it is possible to design a block unit comprising Monomer Unit A and/or Monomer Unit B, and a block unit comprising Monomer Unit A and/or Monomer Unit B and at least one monomer unit selected from Monomer Units C to F. A desired block copolymer can be obtained by designing and polymerizing various monomers according to the desire and bonding them.

In the case that the block unit of the present invention contains Monomer Unit A and/or Monomer Unit B in part or whole, the block unit has preferably two or more molecules, more preferably 5 or more molecules, particularly preferably 10 or more molecules, of Monomer Unit A and/or Monomer Unit B which are continuously bonded to improve thermal and mechanical properties.

An example of block Copolymer I and modified block Copolymer I having n elastomeric property (rubber elasticity) includes a linear block copolymer represented by the following formula (VI):

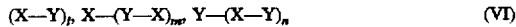

$$(X-Y)_l, X-(Y-X)_m, Y-(X-Y)_n \qquad (VI)$$

wherein l and n represent an integer of 2 or more; m represents an integer of 1 or more; X represents a block unit, 50 wt. % or more of which comprises Monomer Unit B, or a block unit, 50 wt. % or more of which comprises Monomer Units B and D; and Y represents a block unit, 50 wt. % of which comprises Monomer Units C and F; and
a radial block copolymer represented by the following formula (VII):

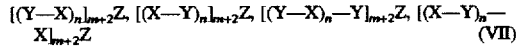

$$[(Y-X)_n]_{m+2}Z, [(X-Y)_n]_{m+2}Z, [(Y-X)_n-Y]_{m+2}Z, [(X-Y)_n-X]_{m+2}Z \qquad (VII)$$

wherein m represents an integer of 0 or more; n represents an integer of 1 of more; X and Y are the same as defined in formula (VI); and Z represents a residual group of a multifunctional coupling agent such as dimethyldichlorosilane, methylene chloride, silicon tetrachloride, tin tetrachloride and epoxy soybean oil or a residual group of an initiator such as a multifunctional organic IA Group metallic compound.

These block copolymers, hydrogenated polymers thereof and modified polymers thereof can exhibit an elastomeric property (rubber elasticity).

As an industrial composite material, the above Block X is preferably a block unit containing a 1,3-cyclohexadiene monomer unit or a block unit containing a 1,3-cyclohexadiene monomer unit and a styrene monomer unit or an α-methylstyrene monomer unit, and the above Block Y is preferably a block unit containing at least one of a 1,3-butadiene monomer unit, an isoprene monomer unit, a monomer unit obtained by hydrogenating a 1,3-butadiene monomer unit and a monomer unit obtained by hydrogenating isoprene.

When Block Y is a 1,3-butadiene monomer unit and/or an isoprene monomer unit, the vinyl bond content in Block Y can be optionally determined and is not particularly restricted. However, when a low temperature property is required, the vinyl bond content is preferably 10 to 90 mol %, more preferably 20 to 80 mol %, based on the total amount of cis and trans 1,4-bonds and vinyl bonds.

A representative block Polymer I having a thermoplastic elastomeric property which is employed for the composite material of the present invention includes triblock Polymer I represented by the formula X—Y—X which comprises 10 to 60 wt. %, preferably 15 to 50 wt. %, of Block X (particularly comprising a 1,3-cyclohexadiene monomer unit) and 90 to 40 wt. %, preferably 85 to 50 wt. %, of Block Y (particularly comprising a butadiene monomer unit), and which has a number-average molecular weight of 1,000 to 200,000.

When the above triblock Polymer I and Modified Polymer I thereof are made into a composite material, high impact strength can be imparted.

When the vinyl bond content is set at 50 mol % or more, preferably 60 mol % or more, the resultant composite material can exhibit good mechanical properties since it has excellent compatibility with an olefin type polymer such as polypropylene (PP).

On the other hand, when the above block Copolymer I is employed as a composite material which is improved in tenacity and thermal properties, it preferably comprises 40 to 90 wt. %, preferably 45 to 85 wt. %, of Block X (particularly comprising a 1,3-cyclohexadiene monomer unit) and 60 to 10 wt. %, preferably 55 to 15 wt. % of Block Y (particularly comprising a hydrogenated butadiene monomer unit), and has a number-average molecular weight of 1,000 to 200,000.

When block Copolymer I of the present invention is compounded with polystyrene (PS) or polyphenylene ether (PPE) to be a composite material, it is referred to employ block Copolymer I having diblock, preferably triblock or more, containing at least one block unit comprising Monomer Unit A and/or Monomer Unit B and at least one Monomer Unit D for improving the mechanical and thermal properties of the composite material.

Polymer I to be used for the composite material of the present invention may be obtained according to any known polymerization methods (e.g., radical polymerization, anionic polymerization, cationic polymerization, ring-opening polymerization, condensation polymerization, addition polymerization, coordination polymerization and the like).

Monomer Unit A contained in Polymer I of the present invention may be introduced in a polymer chain according to any methods, for example, a method comprising polymerizing a cyclic conjugated diene type monomer (hereinafter Monomer B) and, if necessary, other monomers (hereinafter Monomer M) copolymerizable therewith, and subjecting double bonds present in Monomer Unit B to a hydrogenation reaction or an addition reaction to introduce Monomer Unit A, and a method comprising polymerizing a cyclic olefin type monomer (hereinafter Monomer A) and other monomers if necessary.

Polymer I to be used for the composite material of the present invention may be one prepared by linking polymer ends with a known bifunctional or more coupling agent such as dimethyldichlorosilane and methyltrichlorosilane in order to control the molecular weight or obtain a star-shaped polymer according to desire. However, this is not particularly restricted.

When Polymer I to be used for the composite material of the present invention is synthesized, there is proposed a method wherein a block unit comprising one or more Monomer Unit B or a block unit comprising one or more Monomer Units B and M is prepared and linked, and, if necessary, subjected to a hydrogenation reaction and the like.

Such a method includes:

a method comprising polymerizing Monomer B and Monomer M if necessary, polymerizing Monomer M from an end or both ends of the resultant polymer, and hydrogenating the polymer if necessary;

a method comprising polymerizing Monomer M, polymerizing Monomer B and if necessary Monomer M, from an end or both ends of the resultant polymer, and hydrogenating the polymer if necessary;

a method comprising polymerizing Monomer B and if necessary Monomer M, polymerizing Monomer M, further successively polymerizing Monomer B and if necessary Monomer M, and hydrogenating the polymer if necessary;

a method comprising polymerizing Monomer M, polymerizing Monomer B and if necessary Monomer M, further successively polymerizing Monomer M, and hydrogenating the polymer if necessary, a method comprising linking ends of diblock units produced by polymerizing Monomer B and if necessary Monomer M, and polymerizing Monomer M with a known bifunctional or more coupling agent such as dimethyldichlorosilane and methyltrichlorosilane, and carrying out hydrogenation if necessary;

a method comprising polymerizing Monomer B and if necessary Monomer M, introducing functional groups into the ends of the polymers by reacting a terminal modifier such as ethylene oxide and propylene oxide therewith, hydrogenating the polymer if necessary, and linking the resultant polymer with other polymers having functional groups capable of linking therewith;

a method comprising polymerizing Monomer B and if necessary Monomer M, polymerizing Monomer M, introducing functional groups into the ends of the resultant polymer by reacting a terminal modifier such as ethylene oxide and propylene oxide therewith and hydrogenating the polymer if necessary, and linking the polymer with other polymers having functional groups capable of linking therewith;

a method comprising polymerizing Monomer B and Monomer M having a different polymerization rate from Monomer B at the same time to obtain a taper block copolymer, and hydrogenating the resultant copolymer if necessary;

a method comprising charging Monomers B and M at a different composition ratio, and polymerizing them at the same time, and carrying out hydrogenation of the polymer if necessary;

a method comprising polymerizing Monomer B at first, adding and polymerizing Monomer M having a different polymerization rate from Monomer B at optional conversion, polymerizing residual Monomer B to obtain a block copolymer, and hydrogenating the resultant copolymer if necessary; and the like.

The most preferred polymerization method for producing Polymer I is a polymerization method comprising producing a complex compound by reacting an organic metallic compound containing a metal belonging to IA Group in the Periodic Table with a complex agent, conducting living anionic polymerization using the complex compound as a polymerization catalyst, and further conducting a hydrogenation reaction if necessary to obtain Polymer I having an optional molecular weight and an optional polymer structure. The method is illustrated in more detail hereinafter.

In the most preferred polymerization method of the present invention, the organic metallic compound containing a IA Group metal which is used as a polymerization catalyst is preferably an organic lithium compound, an organic sodium compound and an organic potassium compound, particularly preferably an organic lithium compound. The preferred organic lithium compound includes n-butyllithium (n-BuLi), sec-butyllithium (s-BuLi) and tert-butyllithium (t-BuLi). The organic metallic compounds containing a IA Group metal may be used individually or in the form of a mixture of two or more types of the compounds if desired.

The most preferred complexing agent used as a polymerization catalyst is an amine compound. Among the amine compounds, the most preferable one is a tertiary amine compound, particularly N,N,N',N'-tetramethylethylenediamine (TMEDA) and diazabicyclo[2,2,2]octane (DABCO). The amine compounds may be used individually or in the form of a mixture of two or more types of the compounds if desired.

A particularly preferable combination of an organic metallic compound containing IA Group metals and a complexing agent for a polymerization catalyst is a combination of at least one alkyllithium selected from the group consisting of n-butyllithium (n-BuLi), sec-butyllithium (s-BuLi) and tert-butyllithium (t-BuLi) and at least one amine compound selected from the group consisting of N,N,N',N'-tetramethylmethylenediamine (TMMDA), N,N,N',N'-tetramethylethylenediamine (TMEDA), N,N,N',N'-teteramethylpropylenediamine (TMPDA), N,N,N',N'-tetramethylhexenediamine (TMHDA) and diazabicylo[2,2,2]octane (DABCO). The most preferable combination in view of industrial application is the combination of n-butyllithium (n-BuLi) and N,N,N',N'-tetramethylethylenediamine (TMEDA).

In the polymerization method of the present invention, it is preferred to prepare a complexing compound by reacting an organic metallic compound containing a metal belonging to IA Group in the Periodic Table with a complexing agent of an amine compound prior to a polymerization reaction in order to use the resultant complex compound as a polymerization catalyst.

The polymerization catalyst can be prepared using the conventionally known techniques, for example, a method comprising dissolving an organic metallic compound in an organic solvent under an atmosphere of dried inert gas and adding a solution of a complexing agent (an amine compound) thereto, and a method comprising dissolving a complexing agent (an amine compound) in an organic solvent under an atmosphere of dried inert gas and adding an organic metallic compound thereto.

The organic solvent used herein is suitably selected according to the types and amounts of the organic metal and the complexing agent (the amine compound), and preferably used after deaeration and drying are well conducted.

A temperature at which the organic metallic compound and the complexing agent (the amine compound) are reacted is generally −100° to 100° C.

As the dried inert gas, helium, nitrogen and argon are preferably used. In industrial application, nitrogen or argon is preferably used.

In the polymerization method of the present invention, vapor phase polymerization, bulk polymerization, solution polymerization or the like can be suitably employed.

As a polymerization reaction process, batch style, semi-batch style, continuous style or the like can be suitably employed.

Polymerization solvents for solution polymerization include an aliphatic hydrocarbon type solvent, an alicyclic hydrocarbon type solvent, aromatic hydrocarbon type solvent and an ether type solvent. These polymerization solvents may be used individually or in the form of a mixture of two or more types if desired. A preferable polymerization solvent is n-hexane and cyclohexane or a mixture thereof.

The amount of the polymerization catalyst to be used is generally $1\times10^{-6}$ to $1\times10^{-1}$ mol, preferably $5\times10^{-6}$ to $5\times10^{-2}$ mol, in terms of the molar amount of metal atom per mol of the monomer or monomers.

The polymerization temperature in the polymerization method of Polymer I is generally $-100°$ to $150°$ C., preferably $-80°$ to $120°$ C., particularly preferably $-110°$ C., most preferably $0°$ to $100°$ C. In view of industrial application, it is preferably room temperature to $90°$ C.

The time required for the polymerization is generally within 48 hours, particularly preferably 1 to 10 hours.

The atmosphere of the polymerization system is preferably an inert gas such as nitrogen, argon and helium, particularly preferably an inert gas which is fully dried.

The pressure of the polymerization system may be in the range where a monomer and a solvent are sufficiently maintained in a liquid phase in the above-mentioned polymerization temperature range. It is not particularly restricted. Further, it is necessary to conduct the polymerization with care so as not to mix impurities which deactivate the polymerization catalyst and active ends such as water, oxygen and carbon dioxide gas into the polymerization system.

In the polymerization method of the present invention, the polymerization catalysts may be used individually or in the form of a mixture of two or more types if desired.

In the polymerization method of the present invention, after the polymerization reaches a predetermined polymerization rate, there may be, according to desire, added the known terminal modifier such as halogen gas and hydrocarbon gas, the known terminal branching agent such as polyepoxide and polyisocyanate, the known coupling agent such as dimethyldichlorosilane and methyltrichlorosilane, the known polymerization terminator, the known polymerization stabilizer, and the known stabilizer such as a thermal stabilizer, an antioxidant and an ultraviolet absorber.

When Polymer I is a hydrogenated polymer, the most preferable method for preparing the hydrogenated polymer is a method which comprises conducting the hydrogenating reaction in the presence of a hydrogenation catalyst after the polymerization reaction of Polymer I reaches a predetermined polymerization rate to hydrogenate a part of or the whole of the carbon-carbon unsaturated bonds contained in the polymer.

Such a method includes:

a batch production method of a hydrogenated polymer comprising deactivating a polymerization catalyst to stop the polymerization reaction, charging a hydrogenation catalyst to the reactor used in the polymerization reaction and introducing hydrogen;

a semi-batch production method of a hydrogenated polymer comprising deactivating a polymerization catalyst to stop the polymerization reaction, transferring the polymer solution to a reactor different from that used for the polymerization adding a hydrogenation catalyst to the reactor, and introducing hydrogen gas into the reactor;

a continuous production method of a hydrogenated polymer comprising continuously conducting a polymerization and a hydrogenation in a tube type reactor.

The hydrogenation of the present invention is conducted in the presence of Polymer I to be hydrogenated and a hydrogenation catalyst under hydrogen atmosphere.

The method for conducting the hydrogenation in the present invention generally comprises maintaining a polymerization solution at a predetermined temperature under an atmosphere of hydrogen or an inert gas, adding a hydrogenation catalyst with or without stirring, introducing a hydrogen gas, and applying pressure to a certain degree.

Conventionally known techniques are employed for the hydrogenation reaction. For example, batch hydrogenation, semi-batch hydrogenation, continuous hydrogenation and a combination thereof can be employed.

The hydrogenation catalyst applicable to the hydrogenation reaction of the present invention includes a uniform hydrogenation catalyst (an organic metallic compound and an organic metal complex) and a nonuniform hydrogenation catalyst (a solid catalyst) which contain at least one metal selected from transition metals or rare earth metals belonging to Groups VI A to VIII in the Periodic Table, and preferably, the former uniform hydrogenation catalyst or a carrier type solid catalyst carrying a transition metal belonging to Group VIII. These catalysts are used individually or in combination.

The nonuniform hydrogenation catalyst may be carried by an inorganic compound such as silica and zeolite or an organic polymer compound, such as cross-linked polystyrene or an organic polymer compound.

Preferred metals contained in the hydrogenation catalyst to be used in the present invention include titanium, cobalt, nickel, ruthenium, rhodium and palladium.

To make these metals into uniform hydrogenation catalysts, it is necessary for the metals to be coordinated or linked with a ligand such as hydrogen, halogen, a nitrogen compound and an organic compound. A combination is optionally determined, but at least a combination, in which a uniform hydrogenation catalyst is soluble in a solvent, is preferable.

Specific examples of the ligand include hydrogen, fluorine, chlorine, bromine, nitrogen monoxide, carbon monoxide, an organic compound containing functional groups such as hydroxyl, ether, amine, thiol, phosphine, carbonyl, olefin and diene and a non-polar organic compound which does not contain functional groups. These ligands may be used individually or in combination.

When the hydrogenation catalyst is a uniform hydrogenation catalyst containing at least one metal selected from transition metals or rare earth metals which belong to Groups VI A to VIII, it is most preferable in view of industrial use to employ a composite catalyst comprising the above hydrogenation catalyst and an organic metal compound containing at least one metal selected from Groups I A to II A and III B metals such as lithium alkyl, magnesium alkyl and aluminum alkyl.

The amount of the hydrogenation catalyst used, which is represented by the concentration of metallic atom based on the polymer to be hydrogenated, is generally 0.1 to 100,000 ppm, preferably 1 to 50,000 ppm, more preferably 5 to 10,000 ppm, particularly preferably 10 to 10,000 ppm.

When the amount of the hydrogenation catalyst used is small, the reaction rate is not sufficient. When it is large, economic disadvantages are encountered though the reaction rate is enhanced. In this case, separation recovery of the catalyst is required and the influence of the catalyst residue on the polymer cannot be avoided.

The solvent to be used for the hydrogenation reaction is preferably inactive against the hydrogenation catalyst and can dissolve a polymer. Industrially, an aliphatic hydrocarbon type solvent, an alicyclic hydrocarbon type solvent and an aromatic hydrocarbon solvent are preferred. Of these, an aliphatic hydrocarbon type solvent and an alicyclic hydrocarbon solvent or a mixed solvent thereof are most preferred.

From the industrial point of view, it is most preferred that solvents used in a polymerization reaction and a hydrogenation reaction are the same since an economic advantage is achieved by successively conducting the hydrogenation reaction after the polymerization.

The concentration of the polymer in the polymer solution during the hydrogenation reaction is normally 1 to 90 wt. %, preferably 2 to 60 wt. %, more preferably 5 to 40 wt. %. A low concentration is economically disadvantageous. A high concentration unpreferably enhances the viscosity of the polymer solution and reduces the reaction rate.

The temperature of the hydrogenation reaction is generally $-78°$ to $500°$ C., preferably $-10°$ to $300°$ C., most preferably $20°$ to $250°$ C. When the reaction temperature is too low, a high reaction rate cannot be achieved. When it is too high, the hydrogenation catalyst is unpreferably deactivated or the polymer is unpreferably deteriorated.

The pressure of the hydrogenation reaction system in the production method of hydrogenated Polymer I is 0.1 to 500 kg/cm$^2$G, preferably 1 to 400 kg/cm$^2$G, particularly preferably 2 to 3,000 kg/cm$^2$G. When the pressure is too low, a sufficiently high reaction rate cannot be attained. A too high pressure is not economically advantageous since an expensive pressure resistant reactor is necessary as an apparatus, and it unpreferably causes hydrogenation decomposition of the polymer.

The time required for the hydrogenation is usually 5 minutes to 240 hours.

After the hydrogenation is complete, the hydrogenation catalyst can be separated from the reaction liquid and recovered by means of conventionally known methods, if desired.

In the method for producing Hydrogenated Polymer I, conventionally known techniques which are commonly used for recovering a polymer from a polymer solution comprising a known polymer can be employed in order to separate and recover Hydrogenation Polymer I from a polymer solution.

Such conventional methods include, for example, a water vapor coagulation method wherein water vapor is directly contacted with a reaction solution, reprecipitation method wherein a poor solvent of a polymer is added to a reaction solution to precipitate the polymer, a method wherein a reaction solution is heated in a vessel to distill off the solvent, a method wherein a polymer is pelletized using a vented extruder while distilling off the solvent, and a method wherein a reaction solution is charged into hot water and pelletizing the polymer using a vented extruder while distilling off the solvent and water. A most suitable method can be selected from the above methods according to the type of Polymer I and the properties of solvent to be used.

When Polymer I contains a carbon-carbon unsaturated bond in its polymer chain, conventional addition reactions for a carbon-carbon double bond other than the hydrogenation reaction may be conducted, if necessary. Using known reaction reagents, there is added, according to the known reaction, at least one substituting group selected from the first group consisting of a halogen atom, sulfur, boron, an alkyl group having 1 to 20 carbon atoms, an unsaturated aliphatic hydrocarbon group having 2 to 20 carbon atoms, an aryl group having 5 to 20 carbon atoms, a cycloalkyl group having 3 to 20 carbon atoms, a cyclodienyl group having 4 to 20 carbon atoms, a heterocyclic group having a 5 to 10-membered ring which contains at least one nitrogen, oxygen or sulfur as a hetero atom, the second group consisting of a hydroxyl group, a thiol group, a thiocyanate group, an ether group (an epoxy group and the like), a thioether group, a thiocarbonic acid group, a formyl group, a carboxyl group, an carbonyl group, an amino group, an imino group, a nitrosyl group, an isocyanate group, a sulfonic acid group, a phosphoric acid group, a phosphonic acid group, a phosphinic acid group and a silyl group, and the third group consisting of an alkyl group having 1 to 20 carbon atoms and linked with the second group, an unsaturated aliphatic hydrocarbon group having 2 to 20 carbon atoms and linked with the second group, an aryl group having 5 to 20 carbon atoms and linked with the second group, a cycloalkyl group having 3 to 20 carbon atoms and linked with the second group, a cyclodienyl group having 4 to 20 carbon atoms and linked with the second group, or a heterocyclic group having a 5 to 10-membered ring which contains at least one nitrogen, oxygen or sulfur as a hetero atom and linked with the second group. However, this is not particularly restricted.

Modified Polymer I is a modified polymer prepared by adding one or more functional groups containing at least one element selected from the group consisting of oxygen (O), nitrogen (N), silicon (Si), sulfur (S), phosphorus (P), and halogen (F, Cl, Br, I) or an organic compound residual group containing the functional groups to Polymer I.

A method for adding the functional groups or the organic compound residual groups containing functional groups can be conducted according to the conventional methods. Such methods include a method wherein the functional groups or the organic compound residual groups containing functional groups are added in the form of a solution, a melt or a solid in accordance with an ene reaction; a method wherein the functional groups or the organic compound residual groups containing the functional groups are added in the presence or absence of a radical generating agent in accordance with a radical reaction; a method wherein the functional groups or the organic compound residual groups containing functional groups (silyl groups) are added in accordance with a hydrosilylation; a method wherein the functional groups or the organic compound residual groups containing functional groups are added to polymer ends (one end, both ends or the like) by conducting living anion polymerization; and the like.

The added amount of the functional groups or the organic compound residual groups containing functional groups in Modified Polymer I is usually 0.001 to 100 wt. %, preferably 0.005 to 80 wt. %, more preferably 0.01 to 50 wt. %, particularly preferably 0.05 to 40 wt. %, most preferably 0.1 to 20 wt. %, based on Modified Polymer I.

Preferable functional groups or organic compound residual groups containing functional groups to be added to Polymer I include a hydroxyl group, an ether group, an epoxy group, a carboxylic acid group, an ester group, a carboxylate group, an acid anhydride group, an acid halide group, an aldehyde group, a carbonyl group, an amino group, an amide group, an imide group, an imino group, an oxazoline group, a hydrazine group, a hydrazide group, an amidine group, a nitrile group, a nitro group, an isocyano group, a cyanato group, an isocyanato group, a silyl group, a silylester group, a silylether group, a silanol group, a thiol group, a sulfide group, a thiocarboxylic group, a dithiocarboxylic group, a sulfonic acid group, a sulfinic acid group, a sulfenic acid group, a thiocyanato group, an isothiocyanato group, a thioaldehyde group, a thioketone group, a phosphoric acid group, a phosphonic acid group, and a phosphinic acid group.

Particularly preferable functional groups include a hydroxyl group, an epoxy group, a carboxylic group, an ester group, a carboxylate group, an acid anhydride group, an amino group, an amide group, an imide group, an imino group, an oxazoline group, a hydrazine group, a hydrazide group, an isocyano group, a cyanato group, an isocyanato group, a silyl group, a silylester group, a silylether group, a silanol group, a thiol group, a sulfide group, a thiocarboxylic group, and a sulfonic acid group.

These functional groups or organic compound residual groups containing functional groups may be added individually or in combination.

Specific examples of an organic compound which becomes an organic compound residual group include acrylic acid, methacrylic acid, metallic salt acrylate, metallic salt methacrylate, methyl acrylate, methyl methacrylate, ethyl methacrylate, ethyl acrylate, maleic acid, dimethyl maleate, diethyl maleate, succinic acid, dimethyl succinate, diethyl succinate, fumaric acid, dimethyl fumarate, diethyl fumarate, itaconic acid, citraconic acid, Hi-mic acid, crotonic acid, mesaconic acid, sorbic acid, tetrahydrophthalic acid, methyltetrahydrophthalic acid, endo-cis-bicyclo[2,2,1]hept-5-ene2,3-dicarboxylic acid, methyl-bicyclo[2,2,1]hept-5-ene2,3-dicarboxylic acid, maleic acid, trimellitic anhydride, trimellitic anhydride chloride, succinic anhydride, itaconic anhydride, citraconic anhydride, Hi-mic acid anhydride, phthalic anhydride, tetrahydrophthalic anhydride, methyltetrahydrophthalic anhydride, maleimide, succinimide, phthalimide, carbon dioxide, ethylene oxide, propylene oxide, cyclohexene oxide, glycidyl methacrylate, glycidyl acrylate, diglycidylester maleate, diglycidylester succinate, diglycidylester fumarate, glycidyl ester of p-styrene carboxylic acid, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylalkoxy (methoxy, ethoxy, butoxy, etc.) silane, epoxyalkoxy (methoxy, ethoxy, butoxy, etc.) silane, aminoalkoxy (methoxy, ethoxy, butoxy, etc.) silane, trichlorosilane, methyldichlorosilane, dimethylchlorosilane, trimethoxy silane, triethoxy silane, chlorotrimethoxy silane, chlorotriethoxy silane, a diisocanate compound, an oxazorine compound, and the like. The most industrially preferable organic compound is maleic anhydride, glycidyl methacrylate, trichlorosilane, trimethoxysilane, and chloromethoxy silane.

These organic compounds containing functional groups may be used individually or in combination.

The novel polymeric composite material of the present invention is a composition comprising at least two polymers selected from the group consisting of Polymer I and Modified Polymer I.

The novel polymeric composite material of the present invention is specifically exemplified by a composition comprising a homopolymer of Monomer B (hereinafter Homopolymer B) and a copolymer of Monomers B and M (hereinafter Copolymer BM), a composition comprising Homopolymer B and hydrogenated Copolymer BM, a composition comprising hydrogenated Homopolymer B and hydrogenated Copolymer BM, a composition comprising modified polymers thereof, and the like.

When Copolymer BM of the present invention is a block copolymer, it includes a composition comprising Homopolymer B and a diblock copolymer, a composition comprising Homopolymer B and a triblock copolymer, a composition comprising a diblock copolymer and a triblock copolymer, a composition comprising Homopolymer B and a hydrogenated diblock copolymer, a composition comprising Homopolymer B and a hydrogenated triblock copolymer, a composition comprising hydrogenated Homopolymer B and a diblock copolymer, a composition comprising hydrogenated Homopolymer B and a triblock copolymer, a composition comprising hydrogenated Homopolymer B and a hydrogenated diblock copolymer, a composition comprising hydrogenated Homopolymer B and a hydrogenated triblock copolymer, a composition comprising a hydrogenated diblock copolymer and a triblock copolymer, a composition comprising a hydrogenated diblock copolymer and a hydrogenated triblock copolymer, a composition comprising Homopolymer B, a diblock copolymer and a triblock copolymer, a composition comprising Homopolymer B, a hydrogenated diblock copolymer and a hydrogenated triblock copolymer, a composition comprising hydrogenated Homopolymer B, a hydrogenated diblock copolymer and a hydrogenated triblock copolymer, and a composition comprising modified polymers thereof.

Of these, a composition comprising at least one polymer selected from the group consisting of Homopolymer B, hydrogenated Homopolymer B and modified polymers thereof and at least one polymer selected from the group consisting of a diblock copolymer, a triblock copolymer, a hydrogenated diblock copolymer, a hydrogenated triblock copolymer and modified polymers thereof is particularly preferable. A composition comprising at least one polymer selected from the group consisting of Homopolymer B, hydrogenated Homopolymer B and modified polymers thereof and at least one polymer selected from the group consisting of a triblock copolymer, a hydrogenated triblock copolymer and modified polymers thereof is most preferable.

Although the components of Polymer I and/or Modified Polymer I contained in the compositions are not particularly restricted, it is preferred that the minimum amount of the polymer contained in Polymer I and Modified Polymer I is preferably 0.1 wt. % or more, more preferably 1 wt. % or more, based on the total amount of Polymer I and Modified Polymer I.

The method for producing the composite material of the present invention is not particularly restricted. An optional composition can be obtained by applying the polymerization methods disclosed in the present invention and conventional techniques.

The method for producing the composite material of the present invention includes:
  a method comprising individually polymerizing two or more types of Polymer I according to the polymerization method disclosed in the present invention, hydrogenating or modifying the resultant polymers if necessary, removing the solvent and mixing them in the form of a solution to obtain a composition;
  a method comprising individually polymerizing two or more types of Polymer I according to the polymerization method disclosed in the present invention, hydrogenating or modifying the resultant polymers if necessary, removing the solvent, and mixing them in the form of a melt to obtain a composition;

a method comprising individually polymerizing two or more types of Polymer I according to the polymerizing method disclosed in the present invention, hydrogenating the resultant polymers if necessary, removing the solvent, modifying the polymers if necessary, and mixing them in the form of a melt to obtain a composition;

a method comprising polymerizing Monomer B according to the polymerization method disclosed in the present invention, deactivating a part of the polymer ends, copolymerizing Monomer M with polymerized Monomer B, and carrying out hydrogenation and/or modification if necessary to obtain a composition;

a method comprising polymerizing Monomer M according to the polymerization method disclosed in the present invention, copolymerizing Monomer B with polymerized Monomer M, deactivating the polymer ends, polymerizing Monomer B again, and carrying out hydrogenation and/or modification if necessary to obtain a composition;

a method comprising polymerizing Monomer B according to the polymerization method disclosed in the present invention, deactivating the polymer ends, polymerizing Monomer M, copolymerizing Monomer B with the resultant polymer, and carrying out hydrogenation and/or modification if necessary to obtain a composition;

a method comprising polymerizing Monomer B according to the polymerization method disclosed in the present invention, deactivating a part of the polymer ends, polymerizing Monomer M, polymerizing Monomer B, and carrying out hydrogenation and/or modification if necessary to obtain a composition;

a method comprising polymerizing Monomer B according to the polymerization method disclosed in the present invention, deactivating the polymer ends, polymerizing Monomer B again, polymerizing Monomer M, polymerizing Monomer B, and carrying out hydrogenation and/or modification if necessary to obtain a composition;

a method comprising polymerizing Monomer B according to the polymerization method disclosed in the present invention, polymerizing Monomer M, adding a coupling agent in an amount smaller than the active polymer ends, and carrying out hydrogenation and/or modification if necessary to obtain a composition; and the like. A method is suitably selected from these methods according to the purpose and desire for the composition.

The novel polymeric composite material of the present invention may contain other polymers (hereinafter Polymer Q) in addition to Polymer I and Modified Polymer I.

When the ratio of the total amount of Polymer I and Modified Polymer I is defined as $\alpha$ wt. % and the ratio of Polymer Q is defined as $\beta$ wt. %, the compounding ratio of these polymers can be optionally determined according to the purpose and desire so that it is not particularly limited. It is generally $1 \leq \alpha/(\alpha+\beta) < 100$, preferably $1 < \alpha/(\alpha+\beta) < 100$, more preferably $2 \leq \alpha/(\alpha+\beta) \leq 99$, particularly preferably $5 \leq \alpha/(\alpha+\beta) \leq 95$. If used as an industrial composite material, the most preferable compounding ratio is $10 \leq \alpha/(\alpha+\beta) \leq 90$.

As Polymer Q, a conventionally known thermoplastic resin, curable resin, silicone resin, and fluorine resin can be employed. Of these, a thermoplastic resin is preferable.

Specific examples of the thermoplastic resin include an olefin type polymer, a styrene type polymer, a conjugated diene type polymer, a hydrogenated conjugated diene type polymer, a (meth)acrylate type polymer, a (meth)acrylonitrile type polymer, a halogenated vinyl type polymer, an ester type polymer, an ether type polymer, an amide type polymer, an imide type polymer, a sulfide type polymer, a sulfone type polymer, a ketone type polymer, and the like. Of these, an olefin type polymer, a styrene type polymer, a conjugated diene type polymer, a hydrogenated conjugated diene type polymer, an ester type polymer, an ether type polymer, an amide type polymer and a sulfide type polymer are preferred.

The olefin type polymer includes polyethylene (PE), an ethylenenorbornene (or a derivative thereof) copolymer, ethylenepropylene (PP), an ethylenepropylene copolymer (EP, EPR), an ethylene-propylene-diene copolymer (EPDM), poly-1-butene, poly-1-pentene, poly-1-hexene, poly-1-octene, polyisobutylene, polymethyl-1-butene, poly-4-methyl-1-pentene, and the like.

The styrene type polymer includes polystyrene (PSt), syndiotactic polystyrene (s-PSt), a styrene-acrylic acid copolymer, a styrene-maleic anhydride copolymer (SMA), an ABS resin, an AES resin, and the like.

The conjugated type polymer and the hydrogenated conjugated type polymer include polybutadiene (PBd), polyisoprene (PIp), a block, graft, Taper or random copolymer of a butadiene-isoprene copolymer, a styrene-butadiene copolymer (SB, SBS), a propylene-butadiene copolymer, a styrene-isoprene copolymer (SI, SIS), an $\alpha$-methylstyrene-butadiene copolymer, an $\alpha$-methylstyrene-isoprene copolymer, an acrylonitrile-butadiene copolymer, an acrylonitrile-isoprene copolymer, a butadienemethyl methacrylate copolymer and an isoprene-methyl methacrylate copolymer, hydrogenated polymers thereof (such as SEBS), and the like.

The (meth)acrylate type polymer includes polymethyl (meth)acrylate (PMMA), polyethyl (meth)acrylate, polybutyl (meth)acrylate, poly(meth)acrylamide and the like.

The (meth)acrylonitrile type polymer includes poly(meth)acrylonitrile and the like.

The halogenated vinyl type polymer includes polyhalogenated vinyl polymers, polyhalogenated vinylidene polymers and the like.

The ester type polymer includes polybutylene telephthalate (PBT), polyethylene telephthalate (PET), polycarbonate (PC), polyarylate (PAR), liquid crystal polyester (LCP) and the like.

The ether type polymer includes polyacetal (POM), polyoxyethylene, polyethylene glycol (PEG), polypropylene glycol (PPG), polyphenylene ether (PPE) and the like.

The amide type polymer includes aliphatic polyamides such as nylon 4, nylon 6, nylon 8, nylon 9, nylon 10, nylon 11, nylon 12, nylon 46, nylon 66, nylon 610, nylon 612, nylon 636 and nylon 1212, and semi-aromatic polyamides such as nylon 4T (T: telephthalic acid), nylon 4I (I: isophthalic acid), nylon 6T, nylon 6I, nylon 12T, nylon 12I and nylon MXD6 (MXD: methaxylene diamine) and a copolymer of aliphatic polyamide and semi-aromatic polyamide. The aliphatic polyamide and the semi-aromatic polyamide may be used in a mixture.

The imide type polymer includes polyimide (PI), polyamide imide (PAI), polyether imide (PEI) and the like.

The sulfide type polymer includes polyphenylene sulfide (PPS) and the like.

The sulfone type polymer includes polysulfone (PSF), polyethersulfone (PES) and the like.

The ketone type polymer includes polyether ketone (PEK), polyether etherketone (PEEK) and the like.

Specific examples of the curable resin include an unsaturated polyester such as a polydiallylphthalate-phenolformaldehyde copolymer, a urea resin such as urea-formaldehyde, a melamine resin such as polyallylmelamine and a melamineformaldehyde copolymer, a urethane resin, and a phenol resin such as a phenolformaldehyde copolymer.

The polymers to be used for the composite material of the present invention may be used individually or in combination.

When the composite material of the present invention contains Modified Polymer I having one or more functional groups selected from the group consisting of a hydroxyl group, an epoxy group, a carboxylic acid group, an ester group, a carboxylate group, an acid anhydride group, an amino group, an amide group, an imide group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic group or an organic compound residual group containing functional groups, the composite material most preferably contains a reaction product having a covalent linkage formed by reacting Modified Polymer I with Polymer Q to stabilize the morphology of the composite material containing the above Polymer Q.

Specific methods for preparing a reaction product obtained by reacting Modified Polymer I with Polymer Q include, for example, a method wherein a covalent linkage is formed with a functional group contained in an ester type polymer (a hydroxyl group, carboxyl group and an ester group); a method wherein a covalent linkage is formed with a functional group contained in an ether type polymer (a hydroxyl group and an ether group); a method wherein a covalent linkage is formed with a functional group contained in an amide type polymer (an amino group, a carboxyl group and an amide group); a method wherein a covalent linkage is formed with a functional group contained in a sulfide type polymer (a thiol group and a sulfide group); and a method wherein a covalent linkage is formed with Modified Polymer Q (selected from the group consisting of an olefin type polymer, a styrene type polymer, a conjugated diene type polymer, a hydrogenated conjugated diene type polymer, an ether type polymer and a sulfide type polymer) containing one or more types of functional groups selected from the group consisting of a hydroxyl group, an epoxy group, a carboxylic acid group, an ester group, a carboxylate group, an acid anhydride group, an amino group, an amide group, an imide group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic group or an organic compound residual group containing the functional groups.

In order to impart stability, mechanical properties and mold processing properties (flowability) to the resultant composite material at the same time, the ratio of the reaction product obtained from Modified Polymer I and Polymer Q is generally 0.001 wt. % to 100 wt. %, preferably 0.005 wt. % to 90 wt. %, more preferably 0.01 to 70 wt. %, most preferably 0.01 to 50 wt. %, based on the total amount of Polymer I, Modified Polymer I, Polymer Q and the reaction product.

The composite material containing Polymer Q can be prepared by compounding (alloy blending) Polymer Q with a composition containing at least two polymers selected from the group consisting of Polymer I and Modified Polymer I in accordance with conventional methods such as solution blending using common solvents and melt blending using an extruder, a kneader, a Branbender, a Banbury mixer and the like.

The composite material of the present invention may contain, according to the purpose and use, additives, reinforcing agents and the like, which are added to or mixed with common polymeric materials. Such additives and reinforcing agents include a thermal stabilizer, an antioxidant, a stabilizer such as an ultraviolet absorber, a lubricant, a nucleating agent, a plasticizer, a dye, a pigment, a cross-linking agent, an expanding agent, an antistatic agent, a slip inhibitor, an antiblocking agent, a mold lubricant, an organic reinforcing material (e.g., aramide, polyimide, polybenzoxazole, polybenzothiazole, cellulose, etc.), an inorganic reinforcing material (e.g., short fiberglass, long fiberglass, glass-wool, carbon fiber, metallic fiber, rock wool, mineral fiber such as titanium whiskers, an inorganic filler such as talc, mica, wollastonite, kaolin, montmorillonite, cement and concrete, etc.), and the like.

Specific examples of the stabilizer which is suitably incorporated with the composite material of the present invention according to the purpose and desire are exemplified below.

A phenol type antioxidant includes polyvalent phenol oligoester carbonates such as oligoester carbonate (having a polymerization degree of, for example, 2, 3, 4, 5, 6, 7, 8, 9 and 10) of 2,6-di-tert-butyl-p-cresol, stearyl(3,3-dimethyl-4-hydroxybenzyl)thioglycolate, stearyl-β-(4-hydroxy-3,5-di-tert-butylphenol)propionate, distearyl-3,5-di-tert-butyl-4-hydroxybenzylphosphonate, 2,4,6-tris(3',5'-di-tert-butyl-4'-hydroxybenzylthio) 1,3,5-triazine, distearyl(4-hydroxy-3-5-tert-butyl)malonate, 2,2'-methylenebis(4-methyl-6-tert-butylphenol), 4,4'-methylenebis(2,6-di-tert-butylphenol), 2,2'-methylenebis[6-(1-methylcyclohexyl)p-cresol], bis[3,5-bis(4-hydroxy-3-tert-butylphenyl)butyl] glycolate, 4,4'-butylenebis(6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butyl)benzylisocyanurate, 1,3,5-tris(3,5-di-tert-butyl-4-hydroxybenzyl)-2,4,6-trimethylbenzene, tetrakis[methylene-3,5-(3,5-di-tert-butyl-4-hydroxyphenyl)propionate]methane, 1,3,5-tris(3,5-di-tert-butyl-4-hydroxybenzyl)isocyanurate, 1,3,5-tris(3,5-di-tert-butyl-4-hydroxyphenyl)propionyloxyethyl)isocyanurate, 2-octylthio-4,6-di(4-hydroxy-3,5-di-tert-butyl)phenoxy1,3,5-triazine, 4,4'-thiobis(6-tert-butyl-m-cresol), or 4,4'-butylidenebis(2-tert-butyl-5-methylphenol).

A sulfur type antioxidant includes esters (e.g., pentane erythritol tetralauryl thiopropionate) of polyvalent alcohols (e.g., glycerin, trimethylol ethane, trimethylol propane, pentane erythritol, and trishydroxyisocyanurate) of an alkylthiopropionic acid such as butyl, octyl, lauryl and stearyl and a dialkylthiodipropionate such as dilauryl, dimyristyl and distearyl, and the like.

A phosphorus type stabilizer includes trioctylphosphite, trilaurylphosphite, tristearylphosphite, tridecylphosphite, octyl-diphenylphosphite, tris(2,4-di-tert-butylphenyl) phosphite, triphenylphosphite, tris(butoxyethyl)phosphite, tris(nonylphenyl)phosphite, distearylpentane erythritoldiphosphite, tetra(tridecyl)-1,1,3-tris(2-methyl-5-tert-butyl-4-hydroxyphenyl)butanediphosphite, tetralkyl-4, 4'-isopropylidene diphenylphosphite, tetra(tridecyl)-4,4'-butylidenebis(3-methyl-6-tert-butylphenol)diphosphite, tris(3,5-ditert-butyl-4-hydroxyphenyl)phosphite, tris(mono/diphenyl)phosphite, hydrogenated 4,4'-isopropylidene diphenol polyphosphite, bis(octylphenyl)-bis[4,4'-butylidenebis(3-methyl-6-tert-butylphenol)]-1,6-hexanediol diphosphite, phenyl-4,4'-isopropylidenediphenol-pentaneerythritol diphosphite, bis(2,4-di-tert-butylphenyl)

pentaneerythritol diphosphite, bis(2,6-di-tert-butyl-4-methylphenyl)pentaneerythritol diphosphite, tris[4,4'-isopropylidene bis(2-tert-butylphenol)]phosphite, phenyldiisodecylphosphite, di(nonylphenyl) pentaneerythritol diphosphite tris(1,3-distearoyloxyisopropyl)phosphite, 4,4'-isopropylidene bis(2-tert-butylphenol)di(nonylphenyl)phosphite, 9,10-dihydro-9-oxa-10-phosphaphenanthrene-10-oxide, tetrakis (2,4-di-tert-butylphenyl)-4,4'-biphenylene diphosphonite, and the like.

Examples of stabilizer include a 6-hydroxycoumarone derivative, tocophenols such as α-, β-, γ- and δ-tocophenols and a mixture thereof, a 2,5-dimethylsubstitution product, a 2,5,8-trimethyl substitution product or a 2,5,7,8-tetramethyl substitution product of 2-(4-methyl-penta-3-enyl)-6-hydroxycoumarone, 2,2,7-trimethyl-5-tert-butyl-6-hydroxycoumarone, 2,2,5-trimethyl-7-tert-butyl-6-hydroxycoumarone, 2,2,5-trimethyl-6-tert-butyl-6-hydroxycoumarone, 2,2-dimethyl-5-tert-butyl-6-coumarone, and the like.

Further, there can also be exemplified compounds represented by the following general formula:

$$P_xAl_y(OH)_{2x+3y-2z}(Q)_z \cdot aH_2O$$

wherein P represents at least one metal selected from Mg, Ca and Zn; Q represents an anion other than a hydroxy group; and x, y, z and a represent integers of 0 or more. Such compounds are specifically exemplified by:

$Mg_6Al_2(OH)_{16}CO_3 \cdot 4H_2O$
$Mg_8Al_2(OH)_{20}CO_3 \cdot 5H_2O$
$Mg_5Al_2(OH)_{14}CO_3 \cdot 4H_2O$
$Mg_{10}Al_2(OH)_{22}(CO_3)_2 \cdot 4H_2O$
$Mg_6Al_2(OH)_{16}HPO_4 \cdot 4H_2O$
$Ca_6Al_2(OH)_{16}CO_3 \cdot 4H_2O$
$Zn_6Al_2(OH)_{16}CO_3 \cdot 4H_2O$
$Zn_6Al_2(OH)_{16}SO_4 \cdot 4H_2O$
$Mg_6Al_2(OH)_{16}SO_4 \cdot 4H_2O$
$Mg_6Al_2(OH)_{12}CO_3 \cdot 3H_2O$ Moreover, it is possible to employ stabilizers such as 2-benzofuranone type compounds like 3-phenyl-2-benzofuranone and 3-phenyl-5,7-di-tert-butyl-2-benzofuranone.

A light stabilizer includes hydroxybenzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles such as 2-(2'-hydroxy-3'-tert-butyl-5'-methylphenyl)-5-chlorobenzotriazole, 2-(2'-hydroxy-3', 5'-di-tert-butylphenyl)-5-chlorobenzotriazole, 2-(2'-hydroxy-5'-methylphenyl)benzotriazole and 2-(2'-hydroxy-3',5'-di-tert-amylphenyl)benzotriazole; benzoates such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds such as 2,2'-thiobis(4-tert-octylphenol) Ni salt, (2,2'-thiobis(-4-tert-octylphenolate)-n-butylamine Ni and (3,5-di-tert-butyl-4-hydroxybenzyl)phosphonate monoethylester Ni salt; substituted acrylonitriles such as methyl-α-cyano-β-(p-methoxyphenyl)acrylate; dianilide oxalates such as N'-2-methylphenyl-N-2-ethoxy-5-tertbutylphenyl diamide oxalate and N-2-ethylphenyl-N'-2-ethoxyphenyl diamide oxalate; hindered amine compounds obtained as condensates of bis(2,2,6,6-tetramethyl-4-piperidine)sebacate, poly[6-(1,1,3,3-tetramethylbutyl)imino]-1,3,5-triazine-2,4-di[4-(2,2,6,6-tetramethylpiperidyl)imino)hexamethylene] and 2-(4-hydroxy-2,2,6,6-tetramethyl-1-piperidyl)ethanol with dimethyl succinate-1-piperidyl; and the like.

Specific lubricants include aliphatic hydrocarbons such as paraffin wax, polyethylene wax and polypropylene wax; higher fatty acids such as capric acid, lauric acid, myristic acid, palmitic acid, margaric acid, stearic acid, arachidic acid and behenic acid; metallic salts of these compounds such as lithium, potassium, sodium, calcium and magnesium; aliphatic alcohols such as palmityl alcohol, cetyl alcohol and stearyl alcohol; aliphatic amides such as amide caproate, amide caprylate, amide caprate, amide laurate, amide myristate, amide palmitate and amide stearate; esters of fatty acids and alcohols; fluorine compounds such as fluoroalkyl carboxylic acid or a metallic salt thereof and fluoroalkyl sulfonic acid metallic salt; and the like.

Further, specific fillers include inorganic or organic fibrous fillers such as fiberglass, metal coated fiberglass, stainless steel fiber, aluminum fiber, potassium titanate fiber, titanium whisker, carbon fiber, Kevlar and ultra-high-molecular-weight polyethylene; powder, granular and flaky inorganic or organic fillers such as talc, calcium carbonate, magnesium hydroxide, calcium oxide, magnesium sulfate, graphite, nickel powder, copper powder, silver powder, carbon black, metal coated glass beads, glass flakes, glass balloons, stainless steel flakes and metal coated graphite; and the like.

As a method for molding and processing the composite material of the present invention, conventional molding methods can be employed such as a solvent cast molding method, an injection molding method, a gas-assisted injection molding method, a blow (hollow) molding method, an extrusion molding method, a compression molding method, a melt spinning method, a melt coring method, an inflation molding method, and a multilayer molding method.

The composite material of the present invention is suitably applied as an excellent industrial material (a structural material, a functional material or the like) to high-performance plastics and general-purpose plastics such as a special elastomer, thermoplastic elastomer, elastomeric fiber, sheet, film, tube, hose, optical materials and the like.

BEST MODE FOR CARRYING OUT THE INVENTION

[Examples]

Hereinafter, the present invention will be described in more detail referring to Examples, Preparation Examples and Comparative Examples, which should not be construed as limiting the scope of the present invention.

The chemicals used in the Preparation Examples of the present invention were the purest ones commercially available. According to the conventional method, general solvents were deaerated, dehydrated under reflux on an active metal under an atmosphere of an inert gas, and purified by distillation for use.

The number-average molecular weight was shown by a value in terms of standard polystyrene measured by GPC (Gel Permeation Chromatography).

<Testing Method of Composition>
1. Tensile Test (⅛ inch)

The tensile test was conducted according to ASTM D638 to measure tensile strength (TS) and tensile elongation (TE).

2. Flexural Test (⅛ inch)

The flexural test was conducted according to ASTM D790 to measure flexural strength (FS) and flexural modulus (FM).

3. Izod Impact Test

The Izod impact test was conducted according to ASTM D256 at a temperature of 25° C.

4. Heat Distortion Temperature (HDT: ° C.)

The test was conducted according to ASTM D648 under the conditions of a high loading of 1.82 MPa and a low loading of 0.46 MPa, wherein 1 MPa=10.20 kg.f/cm$^2$ and 1 J/m=0.102 kg.cm/cm.

5. Glass Transition Temperature (Tg)

Tg was shown by a value measured according to DSC method using DSC200 manufactured by Seiko Instruments Inc.

[Preparation Example 1]
<Synthesis of Polymer 1: PCHD (Mn≈10,000)>

The inside of a 5L high-pressure autoclave equipped with a magnetic induction agitator, which was well dried, was substituted with dried nitrogen according to the conventional method.

2,850 g of cyclohexane was charged into the autoclave and maintained at room temperature in the dried nitrogen atmosphere.

Then, 15.0 mmol of normal butyllithium (n-BuLi) in terms of a lithium atom was added, and further 7.5 mmol of N,N,N',N'-tetramethylethylene diamine (TMEDA) was added.

After the autoclave was heated to 40° C., 150 g of 1,3-cyclohexadiene (1,3-CHD) was charged into the autoclave and a polymerization was carried out at 40° C. for 4 hours.

After the polymerization was complete, the polymerization was stopped by adding dehydrated n-heptanol being equimolar to a Li atom.

A CHD homopolymer was obtained by adding Irganox B215 (0037HX) manufactured by Ciba-Geigy Ltd. as a stabilizer to the polymer solution and removing the solvent according to the conventional method.

The resultant Polymer 1 had a number-average molecular weight (Mn) of 11,500 and a molecular weight distribution (Mw/Mn) of 1.28.

The 1,2-bond/1,4-bond ratio of the cyclic conjugated diene monomer unit in Polymer 1 was 31/69 (molar ratio). The glass transition temperature (Tg) of Polymer 1 which was measured according to DSC method was 131° C.

[Preparation Example 2]
<Synthesis of Polymer 2: PCHD (Mn≈40,000)>

A CHD homopolymer was obtained by carrying out polymerization in the same manner as in Preparation Example 1 except that 2,400 g of cyclohexane and 600 g of 1,3-CHD were employed.

The resultant Polymer 2 had a number-average molecular weight (Mn) of 44,000 and molecular weight distribution (Mw/Mn) of 1.47.

The 1,2-bond/1,4-bond ratio of the cyclic conjugated diene monomer unit in Polymer 2 was 35/65 (molar ratio). The glass transition temperature (Tg) of Polymer 2 which was measured according to DSC method was 137° C.

[Preparation Example 3]
<Synthesis of Polymer 3: PCHD (Mn≈80,000)>

A CHD homopolymer was obtained by carrying out polymerization in the same manner as in Preparation Example 1 except that 1,800 g of cyclohexane and 1,200 g of 1,3-CHD were employed.

The resultant Polymer 3 had a number-average molecular weight (Mn) of 79,800 and molecular weight distribution (Mw/Mn) of 1.46.

The 1,2-bond/1,4-bond ratio of the cyclic conjugated diene monomer unit in Polymer 3 was 37/63 (molar ratio). The glass transition temperature (Tg) of Polymer 3 which was measured according to DSC method was 143° C.

[Preparation Example 4]
<Synthesis of Polymer 4: HPCHD (Mn≈10,000)>

The inside of a 4L high-pressure autoclave equipped with a magnetic induction agitator, which was well dried, was substituted with dried nitrogen according to the conventional method.

1,000 g of cyclohexane was charged into the autoclave and maintained at 70° C. in the dried nitrogen atmosphere.

1,000 g of 10 wt. % cyclohexane solution of Polymer 1 obtained in Preparation Example 1 was charged into the autoclave, and 50 g of a solid catalyst prepared by attaching 5 wt. % of palladium (Pd) to barium sulfate (BaSO$_4$) was added.

The autoclave was heated to 160° C. after its inside was substituted with hydrogen. Further, a hydrogenation reaction was carried out under a hydrogen pressure of 55 kg/cm$^2$G for 6 hours.

After the hydrogenation was complete, a hydrogenated CHD homopolymer was obtained by adding Irganox B215 (0037HX) manufactured by Ciba-Geigy Ltd. as a stabilizer to the polymer solution and removing the solvent according to the conventional method.

The resultant Polymer 4 had a number-average molecular weight (Mn) of 10,600 and molecular weight distribution (Mw/Mn) of 1.24.

The hydrogenation rate of double bonds contained in the polymer to be hydrogenated which was calculated according to $^1$H-NMR measurement was 100 mol %.

[Preparation Example 5]
<Synthesis of Polymer 5: HPCHD (Mn≈80,000)>

The inside of a 5L high-pressure autoclave equipped with a magnetic induction agitator, which was well dried, was substituted with dried nitrogen according to the conventional method.

1,500 g of cyclohexane was charged into the autoclave and maintained at 70° C. in dried nitrogen.

1,500 g of 10 wt. % cyclohexane solution of Polymer 3 obtained in Preparation Example 3 was charged into the autoclave, and a hydrogenation catalyst comprising titanocene dichloride (TC) and diisobutyl aluminum hydride (DIBAL-H) at a ratio of 1 to 6 was added so as to be 290 ppm based on the polymer.

The autoclave was heated to 160° C. after its inside was substituted with hydrogen. Further, a hydrogenation reaction was carried out under a hydrogen pressure of 35 kg/cm$^2$G for 6 hours.

After the hydrogenation was complete, a hydrogenated CHD homopolymer was obtained by adding Irganox B215 (0037HX) manufactured by Ciba-Geigy Ltd. as a stabilizer to the polymer solution and removing the solvent according to the conventional method.

The resultant Polymer 5 had a number-average molecular weight (Mn) of 80,600 and molecular weight distribution (Mw/Mn) of 1.43.

The hydrogenation rate of double bonds contained in the polymer to be hydrogenated which was calculated according to $^1$H-NMR measurement was 58 mol %.

[Preparation Example 6]
<Synthesis of Polymer 6: CHD-Bd-CHD (10:80:10)>

The inside of a 5L high-pressure autoclave equipped with a magnetic induction agitator, which was well dried, was substituted with dried nitrogen according to the conventional method.

1,280 g of cyclohexane was charged into the autoclave and maintained at room temperature in dried nitrogen atmosphere.

After 10.0 mmol of n-BuLi in terms of lithium atom was added and further 5.0 mmol of TMEDA was added, stirring was carried out at room temperature for 10 minutes.

After the autoclave was heated to 40° C., 60 g of 1,3-CHD was charged into the autoclave and a polymerization was carried out at 40° C. for 2 hours to obtain a CHD homopolymer.

1,600 g (480 g of Bd) of 30 wt. % cyclohexane solution of butadiene (Bd) was charged into the autoclave, and a polymerization was carried out at 40° C. for 2 hours to obtain a CHD-Bd diblock copolymer.

Further, 60 g of 1,3-CHD was charged into the autoclave, and a polymerization reaction was carried out at 40° C. for 4 hours to obtain a CHD-Bd-CHD triblock copolymer.

After the polymerization was complete, the polymerization reaction was stopped by adding dehydrated n-heptanol being equimolar to a Li atom.

A CHD-Bd-CHD triblock copolymer was recovered by adding Irganox B215 (0037HX) manufactured by Ciba-Geigy Ltd. as a stabilizer to the polymer solution and removing the solvent according to the conventional method.

The resultant Polymer 6 had a number-average molecular weight (Mn) of 61,700 and molecular weight distribution (Mw/Mn) of 1.19.

The 1,2-bond/1,4-bond ratio of the cyclic conjugated diene monomer unit in Polymer 6 was 30/70 (mol ratio). The glass transition temperature (Tg) of the CHD block part of Polymer 6 which was measured according to DSC method was 129° C.

Bd had a 1,2-vinyl bond content of 68 mol % based on the total Bd contained in Polymer 6.

[Preparation Example 7]
<Synthesis of Polymer 7: CHD-HBd-CHD (10:80:10)>

The inside of a 5 L high-pressure autoclave equipped with a magnetic induction agitator, which was well dried, was substituted with dried nitrogen according to the conventional method.

1,500 g of cyclohexane was charged into the autoclave and maintained at 70° C. in the dried nitrogen atmosphere.

1,500 g of 10 wt. % cyclohexane solution of Polymer 6 obtained in Preparation Example 6 was charged into the autoclave, and a hydrogenation catalyst comprising titanocene dichloride (TC) and n-BuLi at a ratio of 1 to 1 was added to the polymer so as to be 250 ppm in terms of a metallic atom based on the polymer.

The inside of the autoclave was substituted with hydrogen and heated to 75° C. Then, a hydrogenation was carried out at a hydrogen pressure of 10 kg/cm²G for 30 minutes.

After the hydrogenation was complete, a hydrogenated CHD-Bd-CHD triblock copolymer was obtained by adding Irganox B215 (0037HX) manufactured by Ciba-Geigy Ltd. as a stabilizer to the polymer solution and removing the solvent according to the conventional method.

The resultant Polymer 7 had a number-average molecular weight (Mn) of 60,900 and molecular weight distribution (Mw/Mn) of 1.20.

The hydrogenation rates at CHD block and Bd block parts of the polymer to be hydrogenated were 0 % and 100 mol %, respectively, which were calculated according to $^1$H-NMR measurement.

[Preparation Example 8]
<Synthesis of Polymer 8: CHD-Bd-CHD (25:50:25)>

A CHD-Bd-CHD triblock copolymer was obtained in the same manner as in Preparation Example 6 except that the respective amounts of 1,3-CHD added firstly and secondly were changed to 100 g and the amount of Bd was changed to 200 g.

The resultant Polymer 8 had a number-average molecular weight (Mn) of 45,200 and molecular weight distribution (Mw/Mn) of 1.41.

The 1,2-bond/1,4-bond ratio of the cyclic conjugated diene monomer unit in Polymer 8 was 36/64 (molar ratio). The glass transition temperature (Tg) of the CHD block part of Polymer 8 which was measured according to DSC method was 136° C.

Bd block had a 1,2-vinyl bond content of 71 % based on the total Bd unit contained in Polymer 8.

[Preparation Example 9]
<Synthesis of Polymer 9: CHD-HBd-CHD (25:50:25)>

A hydrogenation reaction was carried out according to the same procedure as in Preparation Example 7 except that Polymer 8 obtained in Preparation Example 8 was employed.

The resultant Polymer 9 had a number-average molecular weight (Mn) of 43,900 and molecular weight distribution (Mw/Mn) of 1.52.

The hydrogenation rates at CHD block and Bd block parts of the polymer to be hydrogenated were 0 % and 100 mol %, respectively, which were calculated according to $^1$H-NMR measurement.

[Preparation Example 10]
<Synthesis of Polymer 10: HCHD-HBd-HCHD (25:50:25)>

A hydrogenation was carried out according to the same procedure as in Preparation Example 4 except that Polymer 8 obtained in Preparation Example 8 was employed.

The resultant Polymer 10 had a number-average molecular weight (Mn) of 41,800 and molecular weight distribution (Mw[Mn) of 1.46.

The hydrogenation rates at CHD block and Bd block parts of the polymer to be hydrogenated were both 100 mol %, which were calculated according to $^1$H-NMR measurement.

[Preparation Example 11]
<Synthesis of Polymer 11: CHD-Ip-CHD (16.5:67:16.5)>

A CHD-Ip-CHD triblock copolymer was obtained in the same manner as in Preparation Example 6 except that the respective amounts of 1,3-CHD added firstly and secondly were changed to 100 g and the amount of isoprene (Ip) was changed to 400 g.

The resultant Polymer 11 had a number-average molecular weight (Mn) of 63,200 and molecular weight distribution (Mw/Mn) of 1.31.

The 1,2-bond/1,4-bond ratio of the cyclic conjugated diene monomer unit in Polymer 11 was 33/67 (molar ratio). The glass transition temperature (Tg) at the CHD block part of Polymer 11 which was measured according to DSC method was 132° C.

Ip block had a 3,4-vinyl bond content of 67 mol % based on the total Ip unit contained in Polymer 11.

[Preparation Example 12]
<Synthesis of Polymer 12: CHD-HIp-CHD (16.5:67:16.5)>

A hydrogenation was carried out according to the same procedure as in Preparation Example 7 except that Polymer 11 obtained in Preparation Example 11 was employed, and the hydrogenation catalyst and the reaction temperature were changed to the hydrogenation catalyst comprising TC and DIBAL-H at a ratio of 1 to 6 and 120° C., respectively.

The resultant Polymer 12 had a number-average molecular weight (Mn) of 61,800 and molecular weight distribution (Mw/Mn) of 1.36.

The hydrogenation rates at CHD block and Ip block parts of the polymer to be hydrogenated were 34 mol % and 93 mol %, respectively, which were calculated according to $^1$H-NMR measurement.

[Preparation Example 13]
<Synthesis of Polymer 13: CHD-Ip-CHD (25:50:25)>

A CHD-Ip-CHD triblock copolymer was prepared in the same manner as in Preparation Example 8 except that Bd was changed to Ip.

The resultant Polymer 13 had a number-average molecular weight (Mn) of 43,500 and molecular weight distribution (Mw/Mn) of 1.32.

The 1,2-bond/1,4-bond ratio of the cyclic conjugated diene monomer unit in Polymer 13 was 35/65 (molar ratio). The glass transition temperature (Tg) at the CHD block part of Polymer 13 which was measured according to DSC method was 134° C.

Ip block had a 3,4-vinyl bond content of 65 mol % based on the total Ip unit contained in Polymer 13.

[Preparation Example 14]
<Synthesis of Polymer 14: CHD-HIp-CHD (25:50:25)>

A hydrogenation reaction was carried out according to the same procedure as in Preparation Example 12 except that Polymer 13 obtained in Preparation Example 13 was employed.

The resultant Polymer 14 had a number-average molecular weight (Mn) of 44,800 and molecular weight distribution (Mw/Mn) of 1.39.

The hydrogenation rates at CHD block and Ip block parts of the polymer to be hydrogenated were 27 mol % and 95 mol %, respectively, which were calculated according to $^1$H-NMR measurement.

[Preparation Example 15]
<Synthesis of Polymer 15: HCHD-HIp-HCHD (25:50:25)>

A hydrogenation was carried out according to the same procedure as in Preparation Example 10 except that Polymer 14 obtained in Preparation Example 14 was employed.

The resultant Polymer 15 had a number-average molecular weight (Mn) of 43,700 and molecular weight distribution (Mw/Mn) of 1.42.

The hydrogenation rates at CHD block and Ip block parts of the polymer to be hydrogenated were both 100 mol %, which were calculated according to $^1$H-NMR measurement.

[Preparation Example 16]
<Synthesis of Polymer 16: CHD-St-CHD (16.5:67:16.5)>

A CHD-St-CHD triblock copolymer was prepared in the same manner as in Preparation Example 11 except that Ip was changed to styrene (St).

The resultant Polymer 16 had a number-average molecular weight (Mn) of 61,100 and molecular weight distribution (Mw/Mn) of 1.27.

The 1,2-bond/1,4-bond ratio of the cyclic conjugated diene monomer unit in Polymer 16 was 36/64 (molar ratio). The glass transition temperature (Tg) at the CHD block part of Polymer 16 which was measured according to DSC method was 137° C.

[Preparation Example 17]
<Synthesis of Polymer 17: HCHD-St-HCHD (16.5:67:16.5)>

A hydrogenation was carried out according to the same procedure as in Preparation Example 12 except that Polymer 16 obtained in Preparation Example 16 was employed.

The resultant Polymer 17 had a number-average molecular weight (Mn) of 60,800 and molecular weight distribution (Mw/Mn) of 1.23.

The hydrogenation rates at CHD block and St block parts of the polymer to be hydrogenated were 36 mol % and 0 mol %, respectively, which were calculated according to $^1$H-NMR measurement.

[Preparation Example 18]
<Synthesis of Polymer 18: CHD-St-CHD (25:50:25)>

A CHD-St-CHD triblock copolymer was prepared in the same manner as in Preparation Example 8 except that Bd was changed to St.

The resultant Polymer 18 had a number-average molecular weight (Mn) of 42,900 and molecular weight distribution (Mw[Mn) of 1.26.

The 1,2-bond/1,4-bond ratio of the cyclic conjugated diene monomer unit in Polymer 18 was 34/66 (molar ratio). The glass transition temperature (Tg) at the CHD block part of Polymer 18 which was measured according to DSC method was 131° C.

[Preparation Example 19]
<Synthesis of Polymer 19: HCHD-HSt-HCHD (25:50:25)>

A hydrogenation reaction was carried out according to the same procedure as in Preparation Example 10 except that Polymer 18 obtained in Preparation Example 18 was employed.

The resultant Polymer 19 had a number-average molecular weight (Mn) of 44,300 and molecular weight distribution (Mw[Mn) of 1.29.

The hydrogenation rates at CHD block and St block parts of the polymer to be hydrogenated were both 100 mol %, which were calculated according to $^1$H-NMR measurement.

[Preparation Example 20]
<Synthesis of Polymer 20: Bd-CHD (50:50)>

The inside of a 5 L high-pressure autoclave equipped with a magnetic induction agitator, which was well dried, was substituted with dried nitrogen according to the conventional method.

2,133 g of cyclohexane was charged into the autoclave and maintained at room temperature in the dried nitrogen atmosphere.

10.0 mmol of n-BuLi in terms of lithium atom was added, and further 5.0 mmol of TMEDA was added. Then, stirring was carried out at room temperature for 10 minutes.

After the autoclave was heated to 40° C., 667 g (200 g of Bd) of 30 wt. % cyclohexane solution of Bd was charged into the autoclave and a polymerization was carried out at 40° C. for 2 hours to obtain a Bd homopolymer.

Further, 200 g of 1,3-CHD was charged into the autoclave and a polymerization was carried out at 40° C. for 5 hours to obtain a Bd-CHD diblock copolymer.

After the polymerization was complete, the polymerization was stopped by adding dehydrated n-heptanol being equimolar to a Li atom.

A Bd-CHD diblock copolymer was obtained by adding Irganox B215 (0037HX) manufactured by Ciba-Geigy Ltd. as a stabilizer to the polymer solution and removing the solvent according to the conventional method.

The resultant Polymer 20 had a number-average molecular weight (Mn) of 40,800 and molecular weight distribution (Mw/Mn) of 1.28.

The 1,2-bond/1,4-bond ratio of the cyclic conjugated diene monomer unit in Polymer 20 was 34/66 (molar ratio). The glass transition temperature (Tg) at the CHD block part of Polymer 20 which was measured according to DSC method was 133° C.

Bd block had a 1,2-vinyl bond content of 68 mol % based on the total Bd unit contained in Polymer 20.

[Preparation Example 21]
<Synthesis of Polymer 21: HBd-CHD (50:50)>

A hydrogenation was carried out according to the same procedure as in Preparation Example 7 except that Polymer 20 obtained in Preparation Example 20 was employed.

The resultant Polymer 21 had a number-average molecular weight (Mn) of 41,400 and molecular weight distribution (Mw/Mn) of 1.32.

The hydrogenation rates at CHD block and Bd block parts of the polymer to be hydrogenated were 0 mol % and 100 mol %, respectively, which were calculated according to $^1$H-NMR measurement.

[Preparation Example 22]
<Synthesis of Polymer 22: Bd-CHD (20:80)>

A Bd-CHD diblock copolymer was prepared in the same manner as in Preparation Example 20 except that the amounts of 1,3-CHD and Bd were changed to 320 g and 80 g, respectively.

The resultant Polymer 22 had a number-average molecular weight (Mn) of 45,200 and molecular weight distribution (Mw/Mn) of 1.43.

The 1,2-bond/1,4-bond ratio of the cyclic conjugated diene monomer unit in Polymer 22 was 37/63 (molar ratio). The glass transition temperature (Tg) at the CHD block part of Polymer 22 which was measured according to DSC method was 138° C.

Bd block had a 1,2-vinyl bond content of 71 mol % based on the total Bd unit contained in Polymer 22

[Preparation Example 23]
<Synthesis of Polymer 23: HBd-CHD (20:80)>

A hydrogenation was carried out according to the same procedure as in Preparation Example 7 except that Polymer 22 obtained in Preparation Example 22 was employed.

The resultant Polymer 23 had a number-average molecular weight (Mn) of 43,900 and molecular weight distribution (Mw/Mn) of 1.46.

The hydrogenation rates at CHD block and Bd block parts of the polymer to be hydrogenated were 0 mol % and 100 mol %, respectively, which were calculated according to $^1$H-NMR measurement.

[Preparation Example 24]
<Synthesis of Polymer 24: HBd-HCHD (20:80)>

A hydrogenation was carried out according to the same procedure as in Preparation Example 10 except that Polymer 23 obtained in Preparation Example 23 was employed.

The resultant Polymer 24 had a number-average molecular weight (Mn) of 44,400 and molecular weight distribution (Mw/Mn) of 1.44.

The hydrogenation rates at CHD and Bd parts of the polymer to be hydrogenated were both 100 mol %, which were calculated according to $^1$H-NMR measurement.

[Preparation Example 25]
<Synthesis of Polymer 25: Ip-CHD (50:50)>

An Ip-CHD diblock copolymer was prepared in the same manner as in Preparation Example 20 except that Bd was changed to Ip.

The resultant Polymer 25 had a number-average molecular weight (Mn) of 41,000 and molecular weight distribution (Mw/Mn) of 1.31.

The 1,2-bond/1,4-bond ratio of the cyclic conjugated diene monomer unit in Polymer 25 was 35/65 (molar ratio). The glass transition temperature (Tg) at the CHD block part of Polymer 25 which was measured according to DSC method was 132° C.

Ip block had a 3,4-vinyl bond content of 66 mol % based on the total Ip unit contained in Polymer 25.

[Preparation Example 26]
<Synthesis of Polymer 26: St-CHD (50:50)>

A St-CHD diblock copolymer was prepared in the same manner as in Preparation Example 20 except that Bd was changed to St.

The resultant Polymer 26 had a number-average molecular weight (Mn) of 43,100 and molecular weight distribution (Mw/Mn) of 1.27.

The 1,2-bond/1,4-bond ratio of the cyclic conjugated diene monomer unit in Polymer 26 was 33/67 (molar ratio). The glass transition temperature (Tg) at the CHD block part of Polymer 26 which was measured according to DSC method was 131° C.

[Preparation Example 27]
<Synthesis of Polymer 27: St-HCHD (50:50)>

A hydrogenation was carried out according to the same procedure as in Preparation Example 12 except that Polymer 26 obtained in Preparation Example 26 was employed and the reaction temperature was changed to 160° C.

The resultant Polymer 27 had a number-average molecular weight (Mn) of 41,800 and molecular weight distribution (Mw/Mn) of 1.33.

The hydrogenation rates at CHD block and St block parts of the polymer to be hydrogenated were 94 mol % and 0 mol %, respectively, which were calculated according to $^1$H-NMR measurement.

[Preparation Example 28]
<Synthesis of Polymer 28: CHD-MMA>

The inside of a 5L high-pressure autoclave equipped with a magnetic induction agitator, which was well dried, was substituted with dried nitrogen according to the conventional method.

2,600 g of cyclohexane was charged into the autoclave and maintained at room temperature in the dried nitrogen. 10.0 mmol of n-BuLi in terms of lithium atom was added, and further 5.0 mmol of TMEDA was added. Then, stirring was carried out at room temperature for 10 minutes.

After the autoclave was heated to 40° C., 200 g of 1,3-CHD was charged into the autoclave and a polymerization was carried out at 40° C. for 4 hours to obtain a CHD homopolymer.

Further, 200 g of methyl methacrylate (MMA) was charged into the autoclave and a polymerization was carried out at 40° C. for 5 hours to obtain a CHD-MMA diblock copolymer.

After the polymerization was complete, the polymerization was stopped by adding dehydrated n-heptanol being equimolar to a Li atom.

A CHD-MMA diblock copolymer was recovered by adding Irganox B215 (0037HX) manufactured by Ciba-Geigy Ltd. as a stabilizer to the polymer solution and removing the solvent according to the conventional method.

The resultant Polymer 28 had a number-average molecular weight (Mn) of 35,600 and molecular weight distribution (Mw/Mn) of 1.88.

The 1,2-bond/1,4-bond ratio of the cyclic conjugated diene monomer unit in Polymer 28 was 31/69 (molar ratio). The glass transition temperature (Tg) at the CHD block part of Polymer 28 which was measured according to DSC method was 131° C.

[Example 1]

Composite Material 1 was produced by dry blending Polymer 1 (PCHD: Mn≈10,000) and Polymer 7 (CHD-HBd- CHD) at a ratio of 5/95 (wt. %) and melt mixing them at 220° to 250° C. in a 15 mmø twin-screw extruder (laboplastomill manufactured by Toyo Seiki Seisaku-Sho, Ltd. having L/D of 17).

The resultant Composite Material 1 was pressure molded at 280° C. to prepare a test piece. The composite material had tensile strength (TS) of 20.10 MPa and tensile elongation (TE) of 610%. The glass transition temperature (Tg) at the CHD block part of Composite Material 1 measured according to the DSC method was 135° C.

[Example 2]

Polymer 1 (PCHD: Mn≈10,000) and Polymer 9 (CHD-HBd-CHD) were dry blended at a ratio of 5/95 (wt. %) and Composite Material 2 was produced according to the same procedure as in Example 1.

The resultant Composite Material 2 was molded in the same manner as in Example 1 to prepare a test piece. The composite material had tensile strength (TS) of 24.50 MPa and tensile elongation (TE) of 300 %. The glass transition temperature (Tg) at the CHD block part of Composite Material 2 measured according to the DSC method was 139° C.

[Example 3]

Polymer 1 (PCHD: Mn≈10,000) and Polymer 12 (CHD-HIp-CHD) were dry blended at a ratio of 5/95 (wt. %) and Composite Material 3 was produced according to the same procedure as in Example 1.

The resultant Composite Material 3 was molded in the same manner as in Example 1 to prepare a test piece. The composite material had tensile strength (TS) of 22.35 MPa and tensile elongation (TE) of 550%. The glass transition temperature (Tg) at the CHD block part of Composite Material 3 measured according to the DSC method was 136° C.

[Example 4]

Polymer 1 (PCHD: Mn≈10,000) and Polymer 14 (CHD-HIp-CHD) were dry blended at a ratio of 5/95 (wt. %) and Composite Material 4 was produced according to the same procedure as in Example 1.

The resultant Composite Material 4 was molded in the same manner as in Example 1 to prepare a test piece. The composite material had tensile strength (TS) of 25.13 MPa and tensile elongation (TE) of 280%. The glass transition temperature (Tg) at the CHD block part of Composite Material 4 measured according to the DSC method was 136° C. [Comparative Examples 1 to 4

Polymer 7 (CHD-HBd-CHD), Polymer 9 (CHD-HBd-CHD), Polymer 12 (CHD-HBd-CHD) and Polymer 14 (CHD-HBd-CHD) were molded according to the same procedure as in Example 1 to prepare test pieces.

The mono-materials (Polymers 7, 9, 12 and 14) had tensile strength (TS) of 12.64, 20.59, 15.74 and 22.53 MPa, respectively, and tensile elongation (TE) of 640, 320, 590 and 290%, respectively.

[Example 5]

Polymer 1 (PCHD: Mn≈10,000) and Polymer 16 (CHD-St-CHD) were dry blended at a ratio of 5/95 (wt. %) and Composite Material 5 was produced according to the same procedure as in Example 1.

The resultant Composite Material 5 was molded in the same manner as in Example 1 to prepare a test piece. The composite material had tensile strength (TS) of 18.7 MPa and tensile elongation (TE) of 2%.

The flexural strength (FS) was 45.5 MPa and the flexural modulus (FM) was 3,085 MPa.

The heat distortion temperature (HDT: 1.82 MPa) was 77° C. The glass transition temperature (Tg) at the CHD block part of Composite Material 5 measured according to the DSC method was 140° C.

[Example 6]

Polymer 1 (PCHD: Mn≈10,000) and Polymer 18 (CHD-St-CHD) were dry blended at a ratio of 5/95 (wt. %) and Composite Material 6 was produced according to the same procedure as in Example 1.

The resultant Composite Material 6 was molded in the same manner as in Example 1 to prepare a test piece. The composite material had flexural strength (FS) of 31.8 MPa and flexural modulus (FM) of 2,953 MPa.

The heat distortion temperature (HDT: 1.82 MPa) was 84° C. The glass transition temperature (Tg) of Composite Material 6 measured according to the DSC method was 136° C.

[Comparative Examples 5 and 6]

Polymer 16 (CHD-St-CHD) and Polymer 18 (CHD-St-CHD) were molded according to the same procedure as in Example 1 to prepare test pieces.

The mono-material (Polymer 16) had tensile strength (TS) of 16.5 MPa and tensile elongation (TE) of 2%.

Polymers 16 and 18 had flexural strength (FS) of 41.1 and 29.7 MPa, respectively and flexural modulus (FM) of 2,864 and 2,890 MPa, respectively.

The heat distortion temperatures (HDT: 1.82 MPa) of these polymers were 73° and 78° C. respectively.

[Example 7]

Polymer 1 (PCHD: Mn. 10,000) and Polymer 7 (CHD-HBd-CHD) were dry blended at a ratio of 5 to 95 wt. % and dissolved in tetrahydrofurane (THF) with stirring to prepare a uniform polymer solution. Then, acetone was added to the solution for reprecipitation to produce Composite Material 7.

The resultant Composite Material 7 was pressure molded at 280° C. to prepare a test piece. The composite material had tensile strength (TS) of 22.15 MPa and tensile elongation (TE) of 650%. The glass transition temperature (Tg) of Composite Material 7 measured according to the DSC method was 137° C.

[Example 8]

Polymer 4 (HPCHD: Mn≈10,000) and Polymer 10 (HCHD-HBd-HCHD) were dry blended at a ratio of 5 to 95 wt. %, and melt mixed at 250° to 280° C. in a 15 mmø twin-screw extruder (laboplastomill manufactured by Toyo Seiki Seisaku-Sho, Ltd. having L/D of 17) to produce Composite Polymer 8.

The resultant Composite Material 8 was pressure molded at 280° C. to prepare a test piece. The composite material had tensile strength (TS) of 18.6 MPa and tensile elongation (TE) of 135%.

[Example 9]

100 parts by weight of a material comprising Polymer 1 (PCHD: Mn≈10,000) and Polymer 11 (CHD-Ip-CHD) at a ratio of 10 to 90, 2 parts by weight of maleic anhydride and 0.5 part by weight of Parhexa 25B manufactured by NOF Corporation were dry blended, and melt mixed at 210° to 250° C. in a 15 mmø twin-screw extruder (laboplastomill manufactured by Toyo Seiki Seisaku-Sho, Ltd. having L/D of 17) to produce Modified Composite Material 1.

The resultant Modified Composite Material 1 was subjected to an extract operation with heated acetone and vacuum dried at 80° C.

When a graft amount of maleic anhydride was measured using sodium methylate, 1.2 mol % of maleic anhydride was grafted.

20 parts by weight of Modified Composite Material 1 and 80 parts by weight of nylon 66 (Leona® 1402S manufactured by Asahi Chemical Industry Co., Ltd.) were dry blended, melt mixed at 260° to 280° C. in a 15 mmø twin-screw extruder (laboplastomill manufactured by Toyo Seiki Seisaku-Sho, Ltd. having L/D of 17), and injection molded at 280° C. to prepare a test piece.

The composite material had tensile strength (TS) of 62.3 MPa and tensile elongation (TE) of 80%.

The flexural strength (FS) and flexural modulus (FM) were 76.3 MPa and 2,250 MPa, respectively.

The heat distortion temperature (HDT: 1.82 MPa) was 64° C.

The Izod impact strength was "N.B." (i.e., the test piece did not break).

[Comparative Example 7]

100 parts by weight of Polymer 11 (CHD-Ip-CHD), 2 parts by weight of maleic anhydride and 0.5 part by weight of Parhexa 25B manufactured by NOF Corporation were dry blended, and melt mixed at 210° to 250° C. in a 15 mmø twin-screw extruder (laboplastomill manufactured by Toyo Seiki Seisaku-Sho, Ltd. having L/D of 17) to produce Modified Polymer 1.

The resultant Modified Polymer 1 was subjected to an extract operation with heated acetone and vacuum dried at 80° C.

When a graft amount of maleic anhydride was measured using sodium methylate, 1.4 mol % of maleic anhydride was grafted.

20 parts by weight of Modified Polymer 1 and 80 parts by weight of nylon 66 (Leona® 1402S manufactured by Asahi Chemical Industry Co., Ltd.) were dry blended, melt mixed at 260° to 280° C. in a 15 mmø twin-screw extruder (laboplastomill manufactured by Toyo Seiki Seisaku-Sho, Ltd. having L/D of 17), and injection molded at 280° C. to prepare a test piece.

The composition had tensile strength (TS) of 56.2 MPa and tensile elongation (TE) of 82%.

The flexural strength (FS) and flexural modulus (FM) were 72.7 MPa and 1,930 MPa, respectively. The heat distortion temperature (EDT: 1.82 MPa) was 61° C.

The Izod impact strength was "N.B." (i.e., the test piece did not break).

[Examples 10 and 11]

Composite materials were produced and evaluated under the same conditions as in Example 9 except that the compounding ratios (wt. ratio) of Modified Composite Material 1 obtained in Example 9 (M: PCHD/CHD-Ip-CHD) to nylon 66 (Leona® 1402S manufactured by Asahi Chemical Industry Co., Ltd.) were changed to 30 to 70 and 50 to 50 in the respective Examples. The results are shown in Table 1.

[Example 12]

Modified Composite Material 2 was produced according to the same procedure as in Example 9 except that Polymer 25 (Ip-CHD) was employed instead of Polymer 11 (CHD-Ip-CHD). Modified Composite Material 2 comprised Polymer 1 (PCHD: Mn≈10,000) and Polymer 25 (Ip-CHD) at a ratio of 10 to 90 (wt. ratio). Then, a composite material having a compounding ratio of Modified Composite Material 2 to nylon 66 (Leona® 1402S manufactured by Asahi Chemical Industry Co., Ltd.) of 20 to 80 (wt. ratio) was produced and evaluated according to the same procedure as in Example 9. The results are shown in Table 1.

[Examples 13 and 14]

Composite materials were produced and evaluated under the same conditions as in Example 9 except that the compounding ratios (wt. ratio) of Modified Composite Material 2 obtained in Example 12 (M: PCHD/ Ip-CHD) to nylon 66 (Leona® 1402S manufactured by Asahi Chemical Industry Co., Ltd.) were changed to 30 to 70 and 50 to 50 in the respective Examples. The results are shown in Table 1.

[Examples 15 to 17]

Modified Composite Material 3 was produced according to the same procedure as in Example 9 except that Polymer 12 (CHD-HIp-CHD) was employed instead of Polymer 11 (CHD-Ip-CHD). Composite materials having compounding ratios of a modified composite material to nylon 66 (Leona® 1402S manufactured by Asahi Chemical Industry Co., Ltd.) of 20 to 80, 30/70 and 50/50 (wt. ratio) were produced and evaluated according to the same procedure as in Example 9. The results are shown in Table 1.

[Examples 18 to 20]

Modified Composite Material 4 was produced according to the same procedure as in Example 9 except that Polymer 21 (HBd-CHD) was employed instead of Polymer 11 (CHD-Ip-CHD). Composite materials having compounding ratios of Modified Composite Material 4 to nylon 66 (Leona® 1402S manufactured by Asahi Chemical Industry Co., Ltd.) of 20 to 80, 30/70 and 50/50 (wt. ratio) were produced and evaluated according to the same procedure as in Example 9. The results are shown in Table 1.

[Example 21]

Composite Material 9 comprising Polymer 1 (PCHD: Mn≈10,000) and Polymer 6 (CHD-Bd-CHD) at a ratio of 10 to 90 was produced according to the same procedure as in Example 1. Composite Material 9 and polypropylene (Asahi Polypro M1500 manufactured by Asahi Chemical Industry Co., Ltd.) were dry blended at a ratio of 20 to 80 (wt. ratio), mixed at 200° to 230° C. in a 15 mmø twin-screw extruder (laboplastomill manufactured by Toyo Seiki Seisaku-Sho, Ltd. having L/D or 17), and pelletized to prepare a composite material. The resultant composite material was injection molded at 230° C. to obtain a test piece for evaluation.

The composite material had tensile strength (TS) of 22.7 MPa and tensile elongation (TE) of 500% or more.

The flexural strength (FS), flexural modulus and heat distortion temperature (HDT: 0.46 MPa) were 37.5 MPa, 1,240 MPa and 98° C., respectively.

The Izod impact strength was "N.B." (i.e., the test piece did not break).

[Example 22]

Composite Material 10 was produced in the same manner as in Example 21 except that Polymer 8 (CHD-Bd-CHD)

was employed instead of Polymer 6. Further, a composite material having a ratio of Composite Material 10 to PP of 20 to 80 was prepared in the same manner as in Example 21 except that the above-obtained Composite Material 10 was employed.

The resultant composite material had tensile strength (TS) of 34.1 MPa and tensile elongation (TE) of 500% or more.

The flexural strength (FS), flexural modulus and heat distortion temperature (HDT: 0.46 MPa) were 41.3 MPa, 1,423 MPa and 121° C., respectively.

The Izod impact strength was "N.B." (i.e., the test piece did not break).

[Example 23]

A composite material was produced in the same manner as in Example 21 except that Composite Material 11 containing Polymer 13 (CHD-Ip-CHD) instead of Polymer 6 was employed.

The resultant composite material had tensile strength (TS) of 24.9 MPa and tensile elongation (TE) of 500% or more.

The flexural strength (FS), flexural modulus and heat distortion temperature (HDT: 0.46 MPa) were 36.4 MPa, 1,083 MPa and 92° C. respectively.

The Izod impact strength was "N.B." (i.e., the test piece did not break).

[Examples 24 and 25]

Composite materials were produced and evaluated according to the same procedure as in Example 21 except that the ratio of Composite Material 9 obtained in Example 21 to polypropylene (Asahi Polypro M1500 manufactured by Asahi Chemical Industry Co., Ltd.) was changed to 30 to 70 and 50 to 50 (wt. ratio) in the respective Examples. The results are shown in Table 2.

[Examples 26 and 27]

Composite materials were produced and evaluated according to the same procedure as in Example 21 except that the ratio of Composite Material 10 obtained in Example 22 (PCHD: Mn≈10,000/CDH-Bd-CHD) to polypropylene (Asahi Polypro M1500 manufactured by Asahi Chemical Industry Co., Ltd.) was changed to 30 to 70 and 50 to 50 (wt. ratio) in the respective Examples. The results are shown in Table 2.

[Examples 28 and 29]

Composite materials were produced and evaluated according to the same procedure as in Example 21 except that the ratio of Composite Material 11 obtained in Example 23 (PCHD: Mn≈10,000/CHD-Ip-CHD) to polypropylene (Asahi Polypro M1500 manufactured by Asahi Chemical Industry Co., Ltd.) was changed to 30 to 70 and 50 to 50 (wt. ratio) in the respective Examples. The results are shown in Table 2.

[Examples 30 and 31]

Using Polymer 20 (Bd-CHD) and Polymer 25 (Ip-CHD), Composite Materials 12 and 13 which comprised Polymer 1 (PCHD: Mn≈10,000) and Polymer 20 (Bp-CHD) at a ratio of 10 to 90 and Polymer 1 (PCHD: Mn≈10,000) and Polymer 25 (Ip-CHD) at a ratio of 10 to 90, respectively, were produced according to the same procedure as in Example 21.

Composite Materials 12 and 13 were individually dry blended with polypropylene (Asahi Polypro M1500 manufactured by Asahi Chemical Industry Co., Ltd.) at a ratio of 20 to 80, mixed at 220° to 240° in a 15 mmø twin-screw extruder (laboplastomill manufactured by Toyo Seiki Seisaku-Sho, Ltd.), and pelletized to obtain composite materials. The resultant composite materials were injection molded at 230° C. to prepare test pieces for evaluation. The results are shown in Table 2.

[Example 32]

100 parts by weight of a material prepared by dry blending Polymer 4 (HPCHD: Mn≈10,000) and Polymer 15 (HCHD-HIp-HCHD) at a ratio of 10 to 90 (wt. ratio), 2 parts by weight of maleic anhydride and 0.5 part by weight of Parhexa 25B (manufactured by NOF Corporation) were mixed and kneaded at 250° to 280° C. in a 15 mmø twin-screw extruder (laboplastomill manufactured by Toyo Seiki Seisaku-Sho, Ltd. having L/D of 17) to produce Modified Composite Material 5.

The resultant Modified Composite Material 5 was subjected to an extraction operation with heated acetone and vacuum dried at 80° C.

When the graft amount of maleic anhydride was measured with sodium methylate, 1.1 mol % of maleic anhydride was grafted.

4 parts by weight of glycidyl methacrylate (GMA) and 0.5 part by weight of Parhexa 25B (manufactured by NOF Corporation) were compounded with 100 parts by weight of polypropylene (Asahi Polypro M1500 manufactured by Asahi Chemical Industry Co., Ltd.), and kneaded at 200° to 220° C. in a 15 mmø twin-screw extruder (laboplastomill manufactured by Toyo Seiki Seisaku-Sho, Ltd. having L/D of 17) to produce GMA Modified Polypropylene (g-PP).

After unreacted GMA was removed by extraction, the graft amount of glycidyl methacrylate was measured by infrared absorption spectrum analysis. 0.7% of glycidyl methacrylate was grafted.

The above Modified Composite Material 5 and GMA Modified PP (g-PP) were dry blended at a ratio of 20 to 80 (wt. ratio), mixed at 220° to 240° C. in a 15 mmø twin-screw extruder (laboplastomill manufactured by Toyo Seiki Seisaku-Sho, Ltd. having L/D of 17), and pelletized to produce a composite material. The resultant composite material was injection molded at 230° C. to prepare a test piece for evaluation. The results are shown in Table 2.

[Example 33]

Using Polymer 4 (HPCHD: Mn 10,000) and Polymer 15 (HCHD-HIp-CHD), Composite Material 14 comprising Polymer 4 and Polymer 15 at a ratio of 10 to 90 was produced according to the same procedure as in Example 21. Composite Material 14 and syndiotactic polypropylene (SPP: 230° C.; 2.16 loading MI=10) were dry blended at a ratio of 20 to 80 (wt. ratio) to produce and evaluate a composite material in the same manner as in Example 31. The results are shown in Table 2.

[Example 34]

Composite Material 15 comprising Polymer 1 (PCHD: Mn≈10,000) and Polymer 21 (HBd-CHD) at a ratio of 10 to 90 was produced according to the same procedure as in Example 21 except that Polymer 21 (HBd-CHD) was employed instead of Polymer 4. Composite Material 15 and high density polyethylene (Suntec® HDJ manufactured by Asahi Chemical Industry Co., Ltd.) were dry blended at a ratio of 20 to 80 (wt. ratio), mixed at 190° to 200° C. in a 15 mmø twin-screw extruder (laboplastomill manufactured by Toyo Seiki Seisaku-Sho, Ltd. having L/D of 17), and pelletized to obtain a composite material. The resultant composite material was injection molded at 200° C. to prepare a test piece for evaluation. The results are shown in Table 3.

[Examples 35 and 36]

Using Polymer 1 (PCHD: Mn≈10,000) and Polymer 16 (CHD-St-CHD), Composite Material 16 comprising Polymer 1 and Polymer 16 at a ratio of 10 to 90 was produced in the same manner as in Example 1. Composite Material 16 and polystyrene (Styron® 685 manufactured by Asahi Chemical Industry Co., Ltd.) were dry blended at ratios of 20 to 80 and 30 to 70 (wt. ratio) in the respective Examples, mixed at 230° to 250° C. in a 15 mmø twin-screw extruder (laboplastomill manufactured by Toyo Seiki Seisaku-Sho, Ltd. having L/D of 17), and pelletized to obtain composite materials. The resultant composite materials were injection molded at 250° C. to prepare test pieces for evaluation. The results are shown in Table 3.

[Examples 37 and 38]

Composite materials were produced and evaluated in the same manner as in Example 35 except that Composite Material 17 containing Polymer 26 (St-CHD) instead of Polymer 16 was employed, and evaluated. The results are shown in Table 3.

[Example 39]

Using Composite Material 16 obtained in Example 35, a composite material was produced by dry blending Composite Material 16 and an acrylonitrile-styrene copolymer (Stylac® AS767 manufactured by Asahi Chemical Industry Co., Ltd.) at a ratio of 20 to 80 (wt. ratio), mixing them at 230° to 250° C. in a 15 mmø twin-screw extruder (laboplastomill manufactured by Toyo Seiki Seisaku-Sho, Ltd. having L/D of 17), and pelletizing them. The resultant composite material was injection molded at 250° C. to prepare a test piece for evaluation. The results are shown in Table 3.

[Example 40]

A composite material was produced and evaluated according to the same procedure as in Example 39 except that Composite Material 18 containing an acrylonitrile-styrene-butadiene copolymer (Stylac® ABS 101 manufactured by Asahi Chemical Industry Co., Ltd.) instead of the acrylonitrile-styrene copolymer used in Example 39 was employed. The results are shown in Table 3.

[Examples 41 and 42]

Using Composite Material 16 obtained in Example 35, composite materials were produced by dry blending Composite Material 16 and syndiotactic polystyrene (SPS: 280° C.; 3.80 kg loading MI of 2.5) at a ratio of 20 to 80 and 30 to 70 in the respective Examples, mixing them at 270° to 290° C. in a 15 mmø twin-screw extruder (laboplastomill manufactured by Toyo Seiki Seisaku-Sho, Ltd.), and pelletizing them.

The resultant composite materials were injection molded at 290° C. to prepare test pieces for evaluation. The results are shown in Table 3.

[Example 43]

Using Polymer 4 (HPCHD: Mn≈10,000) and Polymer 24 (HBd-HCHD), Composite Material 19 was prepared by dry blending Polymer 4 and Polymer 24 at a ratio of 10 to 90 (wt. ratio) and mixing them at 250° to 280° C. in a 15 mmø twin-screw extruder (laboplastomill manufactured by Toyo Seiki Seisaku-Sho, Ltd. having L/D of 17). Polymer 19 and high density polyethylene (Suntec® HDJ240 manufactured by Asahi Chemical Industry Co., Ltd.) were dry blended at a ratio of 20 to 80 (wt. ratio), mixed at 250° to 280° C. in a 15 mmø twin-screw extruder (1 laboplastomill manufactured by Toyo Seiki Seisaku-Sho, Ltd. having L/D of 17), and pelletized to prepare a composite material. The resultant composite material was injection molded at 280° C. to prepare a test piece for evaluation. The results are shown in Table 3.

[Example 44]

100 parts by weight of a material prepared by dry blending Polymer 4 (HPCHD: Mn≈10,000) and Polymer 10 (HCHD-HBd-HCHD) at a ratio of 10 to 90 (wt. ratio), 2 parts by weight of maleic anhydride and 0.5 part by weight of Parhexa 25B (manufactured by NOF Corporation) were compounded and mixed at 250° to 280° C. in a 15 mmø twin-screw extruder (laboplastomill manufactured by Toyo Seiki Seisaku-Sho, Ltd. having L/D of 17) to prepared Modified Composite Material 6.

The resultant Modified Composite Material 6 was subjected to an extract operation with heated acetone and vacuum dried at 80° C.

When the graft amount of maleic anhydride was measured using sodium methylate, 1.2 mol % of maleic anhydride was grafted.

20 parts by weight of Modified Composite Material 6 and 80 parts by weight of nylon 66 (Leona® 1402S manufactured by Asahi Chemical Industry Co., Ltd.) were dry blended, mixed at 2600 to 280° C. in a 15 mmø twin-screw extruder (laboplastomill manufactured by Toyo Seiki Seisaku-Sho, Ltd. having L/D of 17), and pelletized to prepare a composite material. The resultant composite material was injection molded at 280° C. to prepare a test piece for evaluation. The results are shown in Table 4.

[Example 45]

Using Modified Composite Material 5 obtained in Example 32 instead of Modified Composite Material 6 obtained in Example 44, a composite material comprising Modified Composite Material 5 and nylon 66 (Leona® 1402S manufactured by Asahi Chemical Industry Co., Ltd.) at a ratio of 20 to 80 (wt. ratio) was produced and evaluated in the same manner as in Example 44. The results are shown in Table 4.

[Example 46]

A composite material was produced in the same manner as in Example 44 except that nylon 6 (Amilan CM1017 manufactured by Toray Industries, Inc.) was employed instead of nylon 66. The resultant composite material was injection molded at 250° C. to prepare a test piece for evaluation. The results are shown in Table 4.

[Example 47]

A composite material was produced in the same manner as in Example 44 except that nylon 6T (ARLEN AE4200 manufactured by Mitsui Petrochemical Industries, Ltd.) was employed instead of nylon 66. The resultant composite material was injection molded at 260° C. to prepare a test piece for evaluation. The results are shown in Table 4.

[Example 48]

Polymer 4 (HPCHD: Mn≈10,000) and Polymer 27 (St-HCHD) were dry blended at a ratio of 10 to 90 (wt. ratio). Further, the above blended material and a modified polyphenylene ether (Xyron® X1010 manufactured by Asahi Chemical Industry Co., Ltd.) were dry blended at a ratio of 20 to 80 (wt. ratio), mixed at 230° to 280° C. in a 15 mmø twin-screw extruder (laboplastomill manufactured by Toyo Seiki Seisaku-Sho, Ltd. having L/D of 17), and pelletized to prepare a composite material. The resultant composite material was injection molded at 280° C. to prepare a test piece for evaluation. The results are shown in Table 4.

[Examples 49 and 50]

Composite materials were produced and evaluated in the same manner as in Example 48 except that Polymer 17 (HCHD-St-HCHD) or Polymer 19 (HCHD-HSt-HCHD) was employed instead of Polymer 27 (St-HCHD). The results are shown in Table 4.

[Example 51]

100 parts by weight of Composite Material 1 obtained in Example 1 and 0.5 part by weight of vinyl triethoxysilane (A-151 manufactured by Nippon Unicar Co., Ltd.) were dry blended, and melt mixed at 280° to 290° C. in a twin-screw extruder (laboplastomill manufactured by Toyo Seiki Seisaku-Sho, Ltd. having L/D of 17) to prepare Modified Composite Material 7.

Further, Modified Composite Material 7 and polyacetal (POM) (Tenac® 3010 manufactured by Asahi Chemical Industry Co., Ltd.) were dry blended at a ratio of 20 to 80 (wt. ratio), melt mixed at 200° to 220° C. in a 15 mmø twin-screw extruder (laboplastomill manufactured by Toyo Seiki Seisaku-Sho, Ltd. having L/D of 17), and pelletized to prepare a composite material. The resultant composite material was injection molded at 220° C. to prepare a test piece for evaluation. The results are shown in Table 4.

[Example 52]

Using Modified Composite Material 7 obtained in Example 51, a composite material was prepared by dry blending Modified Composite Material 7 and polybutylene terephthalate (VALOX 310 manufactured by GE Plastics Japan Ltd.) at a ratio of 20 to 80 (wt. ratio), melt mixing them at 280° to 290° C. in a 15 mmø twin-screw extruder (laboplastomill manufactured by Toyo Seiki Seisaku-Sho, Ltd. having L/D of 17) and pelletizing them. The resultant composite material was injection molded at 290° C. to prepare a test piece for evaluation. The results are shown in Table 4.

[Example 53]

Using Modified Composite Material 7 obtained in Example 51, a composite material was prepared by dry blending Modified Composite Material 7 and polyphenylene sulfide (PPS) (M2588 manufactured by Phillips Petroleum Toray Inc.) at a ratio of 20 to 80 (wt. ratio), melt mixing them at 300° to 320° C. in a 15 mmø twin-screw extruder (laboplastomill manufactured by Toyo Seiki Seisaku-Sho, Ltd. having L/D of 17) and pelletizing. The resultant composite material was injection molded at 310° C. to prepare a test piece for evaluation. The results are shown in Table 4.

[Example 54]

Using Modified Composite Material 7 obtained in Example 51, a composite material was prepared by dry blending Modified Composite Material 7 and polycarbonate (Panlite L-1250 manufactured by Teijin Chemicals Ltd.) at a ratio of 20 to 80 (wt. ratio), melt mixing them at 300° to 320° C. in a 15 mmø twin-screw extruder (laboplastomill manufactured by Toyo Seiki Seisaku-Sho, Ltd. having L/D of 17) and pelletizing. The resultant composite material was injection molded at 310° C. to prepare a test piece for evaluation. The results are shown in Table 5.

[Example 55]

Using Modified Composite Material 7 obtained in Example 51, a composite material was prepared by dry blending Modified Composite Material 7 and polyarylate (J Polymer U-100 manufactured by Unichika, Ltd.) at a ratio of 20 to 80 (wt. ratio), melt mixing them at 320° to 360° C. in a 15 mmø twin-screw extruder (laboplastomill manufactured by Toyo Seiki Seisaku-Sho, Ltd. having L/D of 17) and pelletizing. The resultant composite material was injection molded at 350° C. to prepare a test piece for evaluation. The results are shown in Table 5.

[Example 56]

Polymer 4 (HPCHD: Mn-10,000) and Polymer 28 (MMA-HCHD) were dry blended at a ratio of 10 to 90 (wt. ratio), and melt mixed at 230° to 250° C. in a 15 mmø twin screw extruder (laboplastomill manufactured by Toyo Seiki Seisaku-Sho, Ltd. having L/D or 17) to prepare Composite Material 20. Composite Material 20 and polymethyl methacrylate (PPMA) (Delpet® 80N manufactured by Asahi Chemical Industry Co., Ltd.) were dry blended at a ratio of 20 to 80 (wt. ratio), melt mixed at 230° to 250° C. and pelletized to obtain a composite material. The resultant composite material was injection molded at 240° C. to prepare a test piece for evaluation. The results are shown in Table 5.

[Example 57]

100 parts by weight of a material prepared by dry blending Polymer 1 (PCHD: Mn≈10,000) and Polymer 2 (PCHD: Mn≈40,000) at a ratio of 10 to 90 (wt. ratio), 2 parts by weight of maleic anhydride and 0.5 part by weight of Parhexa 25B (manufactured by NOF Corporation) were compounded and melt mixed at 250° to 280° C. in a 15 mmø twin-screw extruder (laboplastomill manufactured by Toyo Seiki Seisaku-Sho, Ltd. having L/D of 17) to obtain Modified Composite Material 8.

The resultant Modified Composite Material 8 was subjected to an extraction operation with heated acetone and vacuum dried at 80° C.

When the grafted amount of maleic anhydride was measured with sodium methylate, 1.5 mol % of maleic anhydride was grafted.

20 parts by weight of Modified Composite Material 8 and 80 parts by weight of nylon 66 (Leona® 1402S manufactured by Asahi Chemical Industry Co., Ltd.) were dry blended, mixed at 260° to 280° C. in a 15 mmø twin-screw extruder (laboplastomill manufactured by Toyo Seiki Seisaku-Sho, Ltd. having L/D of 17), and pelletized to obtain a composite material. The resultant composite material was pressure molded at 280° C. to prepare a test piece for evaluation. The results are shown in Table 5.

[Example 58]

Modified Composite Material 9 (an addition amount of maleic anhydride of 1.8 mol %) was prepared in the same manner as in Example 57 except that a material prepared by dry blending Polymer 1 (PCHD: Mn≈10,000) and Polymer 3 (PCHD: Mn≈80,000) at a ratio of 10 to 90 (wt. ratio) was employed. Further, 80 parts by weight of Modified Composite Material 9 and nylon 66 (Leona® 1402S manufactured by Asahi Chemical Industry Co., Ltd.) was dry blended to prepare a composite material according to the same procedure as in Example 57. The resultant composite material was pressure molded at 280° C. to obtain a test piece for evaluation. The results are shown in Table 5.

[Example 59]

Modified Composite Material 10 (an addition amount of maleic anhydride of 0.8 mol %) was prepared in the same manner as in Example 57 except that a material prepared by dry blending Polymer 4 (HPCHD: Mn≈10,000) and Polymer 5 (HPCHD: Mn≈80,000) at a ratio of 10 to 90 (wt. ratio) was employed. Further, a composite material comprising Modified Composite Material 10 and nylon 66 (Leona® 1402S manufactured by Asahi Chemical Industry Co., Ltd.) at a ratio of 20 to 80 (wt. ratio) was prepared according to the same procedure as in Example 57. The resultant composite material was pressure molded at 280° C. to obtain a test piece for evaluation. The results are shown in Table 5.

Field of Industrial Application

The composite material of the present invention shows excellent thermal and mechanical properties while maintaining the properties of a mono material by including at least two polymers selected from Polymer I and Modified Polymer I, and is also able to contain an inorganic reinforcing material, if necessary, so as to be an excellent industrial material (a functional material and a structural material). The composite material of the present invention can be used for high-performance plastics, general purpose plastics, special elastomer, thermoplastic elastomer, elastomeric fiber, a sheet, a film, a tube, a hose, an optical material, an insulating material, a lubricant, a plasticizer, a separation membrane, a selective transmission membrane, a porous membrane, a functional membrane, a functional film (a conductive film, a photosensitive film, etc.), a functional bead (a molecular sieve, a high polymer catalyst, a high polymer catalyst substrate, etc.), automobile parts, electric parts, aerospace parts, railway parts, marine parts, electronic parts, battery parts, parts relating to electronic and multimedia applications, a plastic battery material, solar battery parts, functional fiber, a functional sheet, mechanical parts, medical appliance parts, a packing material for medicine, a sustained release involution material, a substrate for pharmacological substances and printing applications, a container for foods, a general packing material, garments, sport and leisure goods, general merchandise, a tire, a belt, a modifier for other resins, and the like.

Thus, the novel composite material of the present invention is widely applicable to various uses and is therefore advantageously employed as an excellent industrial material.

TABLE 1

| | Structure of Composite Material | | | | Evaluation of Composite Material Property | | | | | | |
|---|---|---|---|---|---|---|---|---|---|---|---|
| | Composition P α | | | | | | | | | HTD | |
| | Polymer I or Modified Polymer I | | Compounding ratio | Polymer Q | Compounding ratio α/β | Tensile strength | | Flexural strength | | | 0.46 | 1.82 |
| | r | s | r/s (w/w) | β | w/w | TS MPa | TE % | FS MPa | FM MPa | Izod J/m | MPa °C. | MPa °C. |
| Ex. 10 | Polymer 1 | Polymer 11 | 10/90* | Nylon 66 | 30/70 | 60.9 | 88 | 73.8 | 2090 | N.B. | — | 64 |
| Ex. 11 | " | " | " | " | 50/50 | 57.3 | 90 | 73.0 | 2050 | N.B. | — | 67 |
| Ex. 12 | " | Polymer 25 | " | " | 20/80 | 62.0 | 77 | 76.0 | 2190 | 61 | — | 69 |
| Ex. 13 | " | " | " | " | 30/70 | 59.1 | 85 | 73.7 | 2040 | 117 | — | 71 |
| Ex. 14 | " | " | " | " | 50/50 | 57.9 | 89 | 73.1 | 2010 | 155 | — | 73 |
| Ex. 15 | " | Polymer 12 | " | " | 20/80 | 63.0 | 80 | 76.6 | 2200 | N.B. | — | 70 |
| Ex. 16 | " | " | " | " | 30/70 | 61.6 | 85 | 74.0 | 2130 | N.B. | — | 71 |
| Ex. 17 | " | " | " | " | 50/50 | 59.0 | 88 | 72.6 | 2100 | N.B. | — | 73 |
| Ex. 18 | " | Polymer 21 | " | " | 20/80 | 56.5 | 83 | 97.5 | 2400 | 59 | — | 73 |
| Ex. 19 | " | " | " | " | 30/70 | 53.0 | 89 | 71.8 | 2103 | 88 | — | 75 |
| Ex. 20 | " | " | " | " | 50/50 | 50.8 | 94 | 70.6 | 2010 | 129 | — | 80 |

*Modified by maleic anhydride

TABLE 2

| | Structure of Composite Material | | | | Evaluation of Composite Material Property | | | | | | | |
|---|---|---|---|---|---|---|---|---|---|---|---|---|
| | Composition P α | | | | | | | | | | HTD | |
| | Polymer I or Modified Polymer I | | Compounding ratio r/s | Polymer Q | Compounding ratio α/β | Tensile strength | | Flexural strength | | | 0.46 | 1.82 |
| | r | s | (w/w) | β | w/w | TS MPa | TE % | FS MPa | FM MPa | Izod J/m | MPa °C. | MPa °C. |
| Ex. 24 | Polymer 1 | Polymer 6 | 10/90 | Poly-propylene | 30/70 | 20.1 | >500 | 34.9 | 1090 | N.B. | 99 | — |
| Ex. 25 | " | " | " | Poly-propylene | 50/50 | 17.7 | >500 | 30.4 | 1077 | N.B. | 101 | — |
| Ex. 26 | " | Polymer 8 | " | Poly-propylene | 30/70 | 30.3 | >500 | 39.8 | 1399 | N.B. | 124 | — |
| Ex. 27 | " | " | " | Poly-propylene | 50/50 | 29.9 | >500 | 38.0 | 1317 | N.B. | 125 | — |
| Ex. 28 | " | Polymer 13 | " | Poly-propylene | 30/70 | 23.8 | >500 | 31.9 | 1014 | N.B. | 94 | — |
| Ex. 29 | " | " | " | Poly-propylene | 50/50 | 20.6 | >500 | 29.7 | 998 | N.B. | 95 | — |
| Ex. 30 | " | Polymer 20 | " | Poly-propylene | 20/80 | 33.0 | >500 | 41.0 | 1410 | 101 | 120 | — |
| Ex. 31 | " | Polymer 25 | " | Poly-propylene | " | 34.6 | >500 | 43.8 | 1421 | 114 | 119 | — |
| Ex. 32 | Polymer 4 | Polymer 15 | 10/90* | g-PP*[1] | " | 25.3 | >500 | 38.1 | 1183 | N.B. | 108 | — |
| Ex. 33 | " | " | 10/90 | S-PP*[2] | " | 40.1 | >500 | 45.7 | 1610 | N.B. | 110 | — |

*Modified by maleic anhydride
*[1]Modified polypropylene glycidyl methacrylate
*[2]Syndiotactic polypropylene

TABLE 3

| | Structure of Composite Material | | | | Evaluation of Composite Material Property | | | | | | | |
|---|---|---|---|---|---|---|---|---|---|---|---|---|
| | Composition P α | | | | | | | | | | HTD | |
| | Polymer I or Modified Polymer I | | Compounding ratio r/s | Polymer Q | Compounding ratio α/β | Tensile strength | | Flexural strength | | | 0.46 | 1.82 |
| | r | s | (w/w) | β | w/w | TS MPa | TE % | FS MPa | FM MPa | Izod J/m | MPa °C. | MPa °C. |
| Ex. 34 | Polymer 1 | Polymer 21 | 10/90 | High density polyethylene | 20/80 | 18.7 | >500 | 19.9 | 712 | N.B. | 70 | — |
| Ex. 35 | " | Polymer 16 | " | Polystyrene | " | 45.0 | 1.1 | 54.4 | 3153 | 8.1 | — | 78 |
| Ex. 36 | " | " | " | " | 30/70 | 46.9 | 1.1 | 54.7 | 3159 | 7.9 | — | 80 |
| Ex. 37 | " | Polymer 26 | " | " | 20/80 | 36.6 | 1.7 | 75.9 | 3580 | 7.0 | — | 82 |
| Ex. 38 | " | " | " | " | 30/70 | 37.0 | 1.5 | 77.0 | 3610 | 7.7 | — | 83 |
| Ex. 39 | " | Polymer 16 | " | AS*[3] | 20/80 | 75.0 | 2.0 | 105 | 3900 | 10.5 | — | 107 |
| Ex. 40 | " | " | " | ABS*[4] | " | 53.0 | 17 | 115 | 2880 | 109 | — | 85 |
| Ex. 41 | " | " | " | S-PS*[5] | " | 35.0 | 10 | 75.0 | 2990 | 93 | — | 99 |
| Ex. 42 | " | " | " | " | 30/70 | 34.0 | 8.0 | 61.5 | 3060 | 90 | — | 105 |
| Ex. 43 | Polymer 4 | Polymer 24 | " | High density polyethylene | 20/80 | 19.6 | 67.1 | 60.3 | 1141 | 22.7 | 81 | — |

*[3]Acrylonitrile-styrene copolymer
*[4]Acrylonitrile-butadiene-styrene copolymer
*[5]Syndiotactic polystyrene

TABLE 4

| | Structure of Composite Material | | | | Evaluation of Composite Material Property | | | | | | |
|---|---|---|---|---|---|---|---|---|---|---|---|
| | Composition P α | | | | | | | | | HTD | |
| | Polymer I or | Compounding ratio | | Compounding ratio | Tensile strength | | Flexural strength | | | 0.46 | 1.82 |
| | Modified Polymer I | r/s | Polymer Q | α/β | TS | TE | FS | FM | Izod | MPa | MPa |
| | r   s | (w/w) | β | w/w | MPa | % | MPa | MPa | J/m | °C. | °C. |
| Ex. 44 | Polymer 4  Polymer 10 | 10/90* | Nylon 66 | 20/80 | 53.8 | 17.6 | 92.2 | 2302 | N.B. | — | 67 |
| Ex. 45 | "          Polymer 15 | " | " | " | 55.1 | 17.0 | 95.4 | 2460 | N.B. | — | 71 |
| Ex. 46 | "          Polymer 10 | " | Nylon 6 | " | 63.3 | >200 | 91.4 | 2610 | N.B. | 181 | — |
| Ex. 47 | "          " | " | Nylon 6T | " | 60.9 | 55.0 | 83.3 | 2090 | N.B. | — | 124 |
| Ex. 48 | "          Polymer 27 | 10/90 | Modified PPE*6 | " | 70.1 | 8.8 | 141 | 3033 | 18.0 | — | 118 |
| Ex. 49 | "          Polymer 17 | " | Modified PPE*6 | " | 75.7 | 11.9 | 147 | 3311 | 20.5 | — | 125 |
| Ex. 50 | "          Polymer 19 | " | Modified PPE*6 | " | 78.9 | 10.4 | 149 | 3407 | 25.9 | — | 126 |
| Ex. 51 | Polymer 1  Polymer 7 | 5/95** | POM*7 | " | 61.0 | 330 | 80.1 | 2270 | 64.0 | — | 55 |
| Ex. 52 | "          " | " | PBT*8 | " | 47.1 | 91.0 | 90.5 | 2490 | 101 | 150 | 120 |
| Ex. 53 | "          " | " | PPS*9 | " | 80.9 | 15.0 | 130 | 3300 | 37.0 | 164 | 95 |

*Modified by maleic anhydride
**Modified by vinyl triethoxysilane
*6Modified polyphenylene ether
*7Polyoxymethylene (polyacetal)
*8Polybutylene terephthalate
*9Polyphenylene sulfide

TABLE 5

| | Structure of Composite Material | | | | Evaluation of Composite Material Property | | | | | | |
|---|---|---|---|---|---|---|---|---|---|---|---|
| | Composition P α | | | | | | | | | HTD | |
| | Polymer I or | Compounding ratio | | Compounding ratio | Tensile strength | | Flexural strength | | | 0.46 | 1.82 |
| | Modified Polymer I | r/s | Polymer Q | α/β | TS | TE | FS | FM | Izod | MPa | MPa |
| | r   s | (w/w) | β | w/w | MPa | % | MPa | MPa | J/m | °C. | °C. |
| Ex. 54 | Polymer 1  Polymer 7 | 5/95** | PC*10 | 20/80 | 77.2 | 170 | 81.0 | 2200 | N.B. | 133 | 127 |
| Ex. 55 | "          " | " | PAR*11 | " | 65.0 | 73.0 | 80.5 | 2060 | N.B. | — | 166 |
| Ex. 56 | Polymer 4  Polymer 28 | 10/90 | PMMA*12 | " | 61.9 | 22.0 | 111 | 3017 | 20.8 | — | 91 |
| Ex. 57 | Polymer 1  Polymer 2 | 10/90* | Nylon 66 | " | 91.4 | 20.7 | 141 | 3940 | 130 | — | 108 |
| Ex. 58 | "          Polymer 3 | " | " | " | 106 | 17.2 | 148 | 4007 | 110 | — | 126 |
| Ex. 59 | Polymer 4  Polymer 5 | " | " | " | 99.6 | 17.0 | 155 | 4150 | 100 | — | 139 |

*Modified by maleic anhydride
**Modified by vinyl triethoxysilane
*10Polycarbonate
*11Polyacrylate
*12Methyl polymethyl methacrylate

We claim:

1. A polymeric composite material comprising at least two polymers selected from the group consisting of a polymer having a polymer chain represented by the following formula (IA) and a polymer having a polymer chain represented by the following formula (IB):

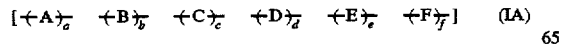
(IA)

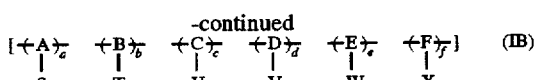
(IB)

wherein A to F represent monomer units constituting a polymer chain and may be arranged in any order; a to f represent wt. % of Monomer Units A to F, respectively, based on the total weight of Monomer Units A to F; the number-average molecular weight of the polymer in terms of standard polystyrene is 500 to 5,000,000; when the polymer represented by formula (IA) and/or the modified polymer represented by formula (IB) comprises Monomer Unit A, at least one Monomer Unit A links to the polymer chain through a 1,4-bond; (A) represents one or more cyclic olefin type monomer units; (B) represents one or more cyclic conjugated diene type monomer units; (C) represents one or more chain conjugated diene type monomer units; (D) represents one or more vinyl aromatic monomer units; (E) represents one or more polar monomer units; (F) represents ethylene monomer units or one or more α-olefin type monomer units; and a to f satisfy the following relation:

a+b+C+d+e+f=100,

0≦a, b ≦100,

0≦c, d, e, f<100, and a+b≠0;

in formula (IB), S to X represent modified groups and independently represent a functional group comprising at least one of oxygen (O), nitrogen (N), silicone (Si), sulfur (S), phosphorus (P) and halogen (F, Cl, Br and I) or an organic compound residual group containing the functional group; and s to x represent wt. % of S to X, respectively, based on the weight of the modified polymer represented by formula (IB), and satisfy the following relation:

0<s+t+u+v+w<100, and

0≦s, t, u, v, w<100.

2. The polymeric composite material according to claim 1, wherein a=100 in at least one of formulas (IA) and (IB).

3. The polymeric composite material according to claim 1, wherein b=100 in at least one of formulas (IA) and (IB).

4. The polymeric composite material according to claim 1, wherein a+b=100 and a>0 in at least one of formulas (IA) and (IB).

5. The polymeric composite material according to claim 1, wherein 0<a+b<100 in at least one of formulas (IA) and (IB).

6. The polymeric composite material according to claim 1, wherein the main polymer chain has a block copolymer structure containing a block unit comprising Monomer Unit A and/or Monomer Unit B in at least one of formulas (IA) and (IB).

7. The polymeric composite material according to claim 6, wherein the main polymer chain has a block copolymer structure containing a block unit consisting of Monomer Unit A and Monomer Unit B in at least one of formulas (IA) and (IB).

8. The polymeric composite material according to claim 6, wherein the main polymer chain has a block copolymer structure containing a block unit consisting of Monomer Unit A or Monomer Unit B in at least one of formulas (IA) and (IB).

9. The polymeric composite material according to claim 8, wherein the main polymer chain has a block copolymer structure containing a block unit consisting of Monomer Unit A in at least one of formulas (IA) and (IB).

10. The polymeric composite material according to claim 8, wherein the main polymer chain has a block copolymer structure containing a block unit consisting of Monomer Unit B in at least one of formulas (IA) and (IB).

11. The polymeric composite material according to claim 1, wherein at least one of the polymer and modified polymer represented by formulas (IA) and (IB), respectively, is a polymer consisting of Monomer Unit A and/or Monomer Unit B and at least one of them is a block copolymer containing a block unit comprising Monomer Unit A and/or Monomer Unit B.

12. The polymeric composite material according to claim 11, wherein at least one of the polymer and modified polymer represented by formulas (IA) and (IB), respectively, is a polymer consisting of Monomer Unit A and/or Monomer Unit B and at least one of them is a block copolymer containing at least two block units comprising Monomer Unit A or Monomer Unit B.

13. The polymeric composite material according to claim 12, wherein at least one of the polymer and modified polymer represented by formulas (IA) and (IB), respectively, is a polymer consisting of Monomer Unit A and/or Monomer Unit B and at least one of them is a triblock copolymer containing at least two block units comprising Monomer Unit A or Monomer Unit B.

14. The polymeric composite material according to any one of claims 1 to 13, wherein, in at least one of formulas (IA) and (IB), Monomer unit A is a monomer unit represented by the following formula (II) and Monomer Unit B is a monomer unit represented by the following formula (III):

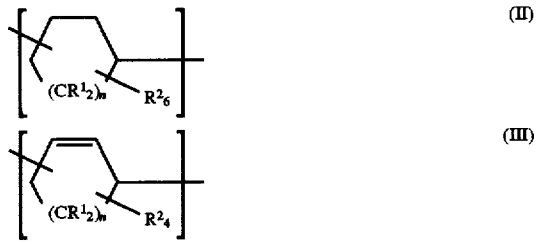

wherein n represents an integer of 1 to 4; $R^1$ independently represents a hydrogen atom, a halogen atom, an alkyl group having 1 to 20 carbon atoms, an unsaturated aliphatic hydrocarbon group having 2 to 20 carbon atoms, an aryl group having 5 to 20 carbon atoms, a cycloalkyl group having 3 to 20 carbon atoms, a cyclodienyl group having 4 to 20 carbon atoms or a heterocyclic group having a 5 to 10-membered ring and at least one nitrogen, oxygen or sulfur as a hetero atom; and $R^2$ independently represents a hydrogen atom, a halogen atom, an alkyl group having 1 to 20 carbon atoms, an unsaturated aliphatic hydrocarbon group having 2 to 20 carbon atoms, an aryl group having 5 to 20 carbon atoms, a cycloalkyl group having 3 to 20 carbon atoms, a cyclodienyl group having 4 to 20 carbon atoms or a heterocyclic group having a 5 to 10-membered ring and at least one nitrogen, oxygen or sulfur as a hetero atom.

15. The polymeric composite material according to claim 14, wherein, in at least one of formulas (IA) and (IB), Monomer unit A is a monomer unit represented by the following formula (IV) and Monomer Unit B is a monomer unit represented by the following formula (V):

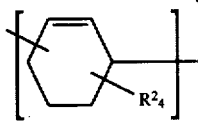

(V)

wherein R² is the same as defined in formula (II).

16. The polymeric composite material according to any one of claims 1 to 13, wherein Monomer Unit A and/or Monomer Unit B contained in a polymer chain is linked with the polymer chain through a 1,2-bond or 1,4-bond and the amount of 1,2-bond is 1 to 99 mol % based on the total amount of 1,2-bond and 1,4-bond.

17. The polymeric composite material according to claim 16, wherein the amount of 1,2-bond is 5 to 95 mol % based on the total amount of 1,2-bond and 1,4-bond.

18. The polymeric composite material according to claim 17, wherein the amount of 1,2-bond is 10 to 90 mol % based on the total amount of 1,2-bond and 1,4-bond.

19. The polymeric composite material according to any one of claims 1 to 13, wherein S to X in formula (IB) independently represents a functional group selected from the group consisting of a hydroxyl group, an ether group, an epoxy group, a carboxylic acid group, an ester group, a carboxylate group, an acid anhydride group, an acid halogen compound group, an aldehyde group, a carbonyl group, an amino group, an amide group, an imide group, an imino group, an oxazoline group, a hydrazine group, a hydrazide group, an amidine group, a nitrile group, a nitro group, an isocyano group, a cyanato group, an isocyanato group, a silyl group, a silylester group, a silylether group, a silanol group, a thiol group, a sulfide group, a thiocarboxylic acid group, a dithiocarboxylic group, a sulfonic acid group, a sulfinic acid group, a sulfenic acid group, a thiocyanato group, an isothiocyanato group, a thioaldehyde group, a thioketone group, a phosphoric acid group, a phosphonic acid group and a phosphinic acid group, or an organic compound residual group containing said functional group.

20. The polymeric composite material according to any one of claims 1 to 13, wherein, S to X in formula (IB) independently represents a functional group selected from the group consisting of a hydroxyl group, an epoxy group, a carboxylic group, an ester group, a carboxylate group, an acid anhydride group, an amino group, an amide group, an imide group, an imino group, an oxazoline group, a hydrazine group, a hydrazide group, an isocyano group, a cyanato group, an isocyanato group, a silyl group, a silylester group, a silylether group, a silanol group, a thiol group, a sulfide group, a thiocarboxylic acid group and a sulfonic acid group, or an organic compound residual group containing said functional group.

21. The polymeric composite material according to claim 1, wherein the minimum amount of the polymer contained in the polymer and modified polymer represented by formulas (IA) and (IB), respectively, is 1% by weight or more based on the total amount of the polymer and modified polymer represented by formulas (IA) and (IB), respectively.

22. The polymeric composite material according to claim 1, wherein the composite material further contains a second polymer other than the polymer and modified polymer represented by formulas (IA) and (IB), respectively, and the total amount of the polymer and modified polymer represented by formulas (IA) and (IB), respectively, is 1% by weight or more based on the total amount of the polymer and modified polymer represented by formulas (IA) and (IB), respectively, and said second polymer.

23. The polymeric composite material according to claim 22, wherein said second polymer is a thermoplastic resin or a curable resin.

24. The polymeric composite material according to claim 22, wherein said second polymer is a thermoplastic resin.

25. The polymeric composite material according to claim 24, wherein the thermoplastic resin is at least one polymer selected from the group consisting of an olefin type polymer, a styrene type polymer, a conjugated diene type polymer, a hydrogenated conjugated diene type polymer, a (meth)acrylate type polymer, a (meth)acrylonitrile type polymer, a halogenated vinyl type polymer, an ester type polymer, an ether type polymer, an amide type polymer, an imide type polymer, a sulfide type polymer, a sulfone type polymer, and a ketone type polymer.

26. The polymeric composite material according to claim 25, wherein the composite material comprises at least one modified polymer represented by formula (IB) in which at least one of S to X is a functional group selected from the group consisting of a hydroxyl group, an epoxy group, a carboxylic acid group, an ester group, a carboxylate group, an acid anhydride group, an amino group, an amide group, an imide group, an imino group, an oxazoline group, an isocyano group, a cyanato group, an isocyanato group, a silylester group, a silylether group, a silanol group, a thiol group, a sulfide group, a thiocarboxylic acid group and a sulfonic acid group, or an organic compound residual group containing said functional group, and at least one other polymer selected from the polymer consisting of an ester type group containing at least one functional group selected from the group consisting of a hydroxyl group, a carboxyl group and an ester group, an ether type polymer containing a hyroxyl group and/or an ether group, an amide type polymer containing at least one functional group selected from the group consisting of an amino group, a carboxyl group and an amide group, and a sulfide type polymer containing a thiol group and/or a sulfide group; and the amount of reaction product obtained by reacting at least one of the above functional groups or organic compound residual groups of said modified polymer with at least one of said other polymers is 0.001 to 100% by weight based on the total amount of the polymer and modified polymer represented by formulas (IA) and (IB), respectively, the other polymers and the reaction product.

27. The polymeric composite material according to claim 25, wherein the composite material comprises at least one modified polymer represented by formula (IB) in which at least one of S to X is a functional group selected from the group consisting of a hydroxyl group, an epoxy group, a carboxylic acid group, an ester group, a carboxylate group, an acid anhydride group, an amino group, an amide group, an imide group, an imino group, an oxazoline group, an isocyano group, a cyanato group, an isocyanato group, a silylester group, a silylether group, a silanol group, a thiol group, a sulfide group, a thiocarboxylic acid group and a sulfonic acid group, or an organic compound residual group containing said functional group, and at least one modified other polymer selected from the group consisting of a modified olefin type polymer, a modified styrene type polymer, a modified conjugated diene type polymer, a modified hydrogenated conjugated diene type polymer, a modified ether type polymer and a modified sulfide type polymer which contains a functional group selected from the group consisting of a hydroxyl group, an epoxy group, a carboxylic acid group, an ester group, a carboxylate group, an acid anhydride group, an amino group, an amide group, an imide group, an imino group, an oxazoline group, an isocyano group, a cyanato group, an isocyanato group, a silylester group, a silylether group, a silanol group, a thiol group, a sulfide group, a thiocarboxylic acid group and a sulfonic acid group, or an organic compound residual group containing said functional group; and the amount of reaction product obtained by reacting at least one of the above functional groups or organic compound residual groups of said modified polymer represented by formula (IB) with at least one of said modified other polymers is 0.001 to 100% by weight based on the total amount of the composite material comprising the polymer and modified polymer represented by formulas (IA) and (IB), respectively, other polymers and the reaction product.

* * * * *